US012177458B2

(12) United States Patent
Yoo et al.

(10) Patent No.: US 12,177,458 B2
(45) Date of Patent: *Dec. 24, 2024

(54) IMAGE DECODING METHOD USING BDPCM AND DEVICE THEREFOR

(71) Applicant: LG ELECTRONICS INC., Seoul (KR)

(72) Inventors: Sunmi Yoo, Seoul (KR); Junghak Nam, Seoul (KR); Jungah Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/517,527

(22) Filed: Nov. 22, 2023

(65) Prior Publication Data

US 2024/0089470 A1 Mar. 14, 2024

Related U.S. Application Data

(63) Continuation of application No. 18/098,382, filed on Jan. 18, 2023, now Pat. No. 11,871,009, which is a
(Continued)

(51) Int. Cl.
*H04N 19/176* (2014.01)
*H04N 19/132* (2014.01)
(Continued)

(52) U.S. Cl.
CPC ......... *H04N 19/176* (2014.11); *H04N 19/132* (2014.11); *H04N 19/159* (2014.11); *H04N 19/593* (2014.11); *H04N 19/70* (2014.11)

(58) Field of Classification Search
CPC .... H04N 19/105; H04N 19/11; H04N 19/132; H04N 19/159; H04N 19/593; H04N 19/70

See application file for complete search history.

(56) References Cited

U.S. PATENT DOCUMENTS 11,871,009 B2 * 1/2024 Yoo ...................... H04N 19/105
2020/0275111 A1 * 8/2020 Zhao ...................... H04N 19/46
(Continued)

OTHER PUBLICATIONS

"AHG11: Block DPCM for Screen Content Coding"—Mohsen Abdoli et al., JVET of ITU-T SG 16 WP 3 and ISO/IEC JTC 1/SC 29/WG 11; 12th Meeting: Macao, CN, Oct. 3-12, 2018. (Year: 2018).*
(Continued)

*Primary Examiner* — Mainul Hasan
(74) *Attorney, Agent, or Firm* — Bryan Cave Leighton Paisner LLP

(57) ABSTRACT

An image decoding method performed by a decoding apparatus according to the present document comprises the steps of: deriving prediction samples for a first sample and a second sample of the current block on the basis of BDPCM-related information about the current block and neighboring samples of the current block; deriving residual samples for the first sample and the second sample on the basis of a residual coefficient of the first sample and a modified residual coefficient of the second sample; and storing, as the intra prediction mode of the current block, the intra prediction mode in the prediction direction of the current block, which is derived on the basis of a BDPCM direction flag.

4 Claims, 14 Drawing Sheets

Related U.S. Application Data continuation of application No. 17/612,525, filed as application No. PCT/KR2020/006702 on May 22, 2020, now Pat. No. 11,595,668.

(60) Provisional application No. 62/851,625, filed on May 22, 2019.

(51) Int. Cl.
*H04N 19/159* (2014.01)
*H04N 19/593* (2014.01)
*H04N 19/70* (2014.01)

(56) References Cited

U.S. PATENT DOCUMENTS

| | | | | |
|---|---|---|---|---|
| 2020/0296381 | A1* | 9/2020 | Coban | H04N 19/48 |
| 2020/0329257 | A1* | 10/2020 | Zhao | H04N 19/615 |
| 2021/0306654 | A1* | 9/2021 | Lee | H04N 19/46 |
| 2021/0306666 | A1* | 9/2021 | Lee | H04N 19/105 |
| 2021/0385459 | A1* | 12/2021 | Zhu | H04N 19/593 |
| 2022/0232205 | A1* | 7/2022 | Chiang | H04N 19/186 |

OTHER PUBLICATIONS

"Intra Block-DPCM With Layer Separation of Screen Content in VVC"—Mohsen Abdoli et al., 978-1-5386-6249-6/19/$31.00 © 2019 IEEE (Year: 2019).*

* cited by examiner

IMAGE DECODING METHOD USING BDPCM AND DEVICE THEREFOR

This application is a Continuation Application of U.S. patent application Ser. No. 18/098,382, filed on Jan. 18, 2023, now allowed, which is a Continuation Application of U.S. patent application Ser. No. 17/612,525, filed on Nov. 18, 2021, now U.S. Pat. No. 11,595,668, issued on Feb. 28, 2023 which is a National Stage of International Application No. PCT/KR2020/006702, filed on May 22, 2020 which claims the benefit of U.S. Provisional Application No. 62/851,625, filed on May 22, 2019 the contents of which are all hereby incorporated by reference herein in their entirety.

BACKGROUND OF THE DISCLOSURE

Field of the Disclosure

The present disclosure relates to an image coding technology and, more particularly, to an image decoding method and apparatus for coding image information by performing BDPCM in an image coding system.

Related Art

Recently, demand for high-resolution, high-quality images, such as High Definition (HD) images and Ultra High Definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high-resolution and high-quality images.

SUMMARY

A technical object of the present disclosure is to provide a method and apparatus for improving image coding efficiency.

Another technical object of the present disclosure is to provide a method and apparatus for increasing efficiency of BDPCM.

According to an embodiment of the present disclosure, an image decoding method performed by a decoding apparatus is provided. The method includes obtaining image information including Block-based Delta Pulse Code Modulation (BDPCM) related information and residual information for a current block, deriving prediction samples for a first sample and a second sample of the current block based on the BDPCM related information and a neighboring sample of the current block, deriving residual coefficients of the first sample and the second sample based on the residual information, deriving a modified residual coefficient of the second sample by adding a residual coefficient of the first sample and a residual coefficient of the second sample, deriving residual samples for the first sample and the second sample based on the residual coefficient of the first sample and the modified residual coefficient of the second sample, deriving reconstructed samples for the first sample and the second sample based on the prediction samples and the residual samples, and storing an intra prediction mode of a prediction direction of the current block derived based on a BDPCM direction flag as an intra prediction mode of the current block.

According to another embodiment of the present disclosure, a decoding apparatus performing image decoding is provided. The decoding apparatus includes an entropy decoder configured to obtain image information including Block-based Delta Pulse Code Modulation (BDPCM) related information and residual information for a current block, a predictor configured to derive prediction samples for a first sample and a second sample of the current block based on the BDPCM related information and a neighboring sample of the current block, a residual processor configured to derive residual coefficients of the first sample and the second sample based on the residual information, to derive a modified residual coefficient of the second sample by adding a residual coefficient of the first sample and a residual coefficient of the second sample, to derive residual samples for the first sample and the second sample based on the residual coefficient of the first sample and the modified residual coefficient of the second sample, an adder configured to derive reconstructed samples for the first sample and the second sample based on the prediction samples and the residual samples, and a memory configured to store an intra prediction mode of a prediction direction of the current block derived based on a BDPCM direction flag as an intra prediction mode of the current block.

According to another embodiment of the present disclosure, an image encoding method performed by an encoding apparatus is provided. The method includes deriving prediction samples for a first sample and a second sample of a current block based on Block-based Delta Pulse Code Modulation (BDPCM) and a neighboring sample of the current block, deriving residual samples for the first sample and the second sample based on the prediction samples, deriving residual coefficients of the first sample and the second sample based on the residual samples, encoding residual information of the current block based on the BDPCM and the residual coefficients, encoding a BDPCM flag representing that the BDPCM is applied to the current block and a BDPCM direction flag representing a prediction direction for the current block, and storing an intra prediction mode of the prediction direction as an intra prediction mode of the current block.

According to another embodiment of the present disclosure, an image encoding apparatus is provided. The encoding apparatus includes a predictor configured to derive prediction samples for a first sample and a second sample of a current block based on Block-based Delta Pulse Code Modulation (BDPCM) and a neighboring sample of the current block, a subtractor configured to derive residual samples for the first sample and the second sample based on the prediction samples, a residual processor configured to derive residual coefficients of the first sample and the second sample based on the residual samples, an entropy encoder configured to encode residual information of the current block based on the BDPCM and the residual coefficients, to encode a BDPCM flag representing that the BDPCM is applied to the current block and a BDPCM direction flag representing a prediction direction for the current block, and a memory configured to store an intra prediction mode of the prediction direction as an intra prediction mode of the current block.

Advantageous Effects

According to the present disclosure, intra prediction accuracy and coding efficiency can be improved by storing an intra prediction mode according to a BDPCM prediction direction as an intra prediction mode of a current block.

According to the present disclosure, by storing the intra prediction mode according to the BDPCM prediction direction as the intra prediction mode of the current block, the accurate intra prediction mode can be referred to in the prediction of the neighboring block, and overall residual coding efficiency can be improved.

DESCRIPTION OF EXEMPLARY EMBODIMENTS

Figure 1:
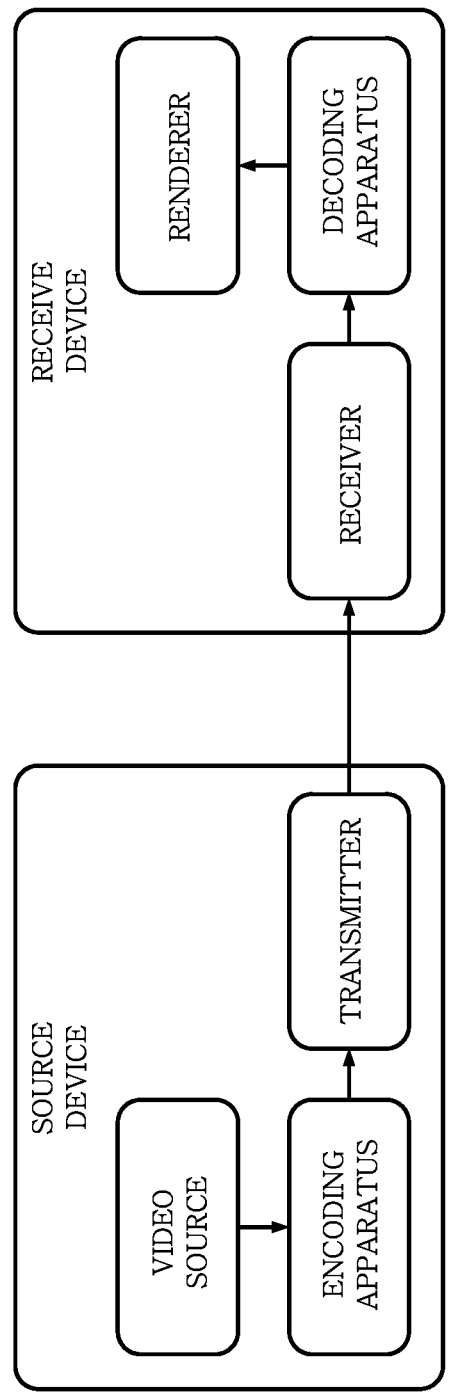
FIG. 1 briefly illustrates an example of a video/image coding device to which embodiments of the present disclosure are applicable.

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

Present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. In addition, a subpicture may represent a rectangular region of one or more slices within a picture. That is, a subpicture contains one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present description, "A or B" may mean "only A", "only B" or "both A and B". In other words, in the present specification, "A or B" may be interpreted as "A and/or B". For example, "A, B or C" herein means "only A", "only B", "only C", or "any and any combination of A, B and C".

A slash (/) or a comma (comma) used in the present description may mean "and/or". For example, "A/B" may mean "A and/or B". Accordingly, "A/B" may mean "only A", "only B", or "both A and B". For example, "A, B, C" may mean "A, B, or C".

In the present description, "at least one of A and B" may mean "only A", "only B", or "both A and B". In addition, in the present description, the expression "at least one of A or B" or "at least one of A and/or B" may be interpreted the same as "at least one of A and B".

In addition, in the present description, "at least one of A, B and C" means "only A", "only B", "only C", or "any combination of A, B and C". Also, "at least one of A, B or C" or "at least one of A, B and/or C" may mean "at least one of A, B and C".

In addition, parentheses used in the present description may mean "for example". Specifically, when "prediction (intra prediction)" is indicated, "intra prediction" may be proposed as an example of "prediction". In other words, "prediction" in the present description is not limited to "intra prediction", and "intra prediction" may be proposed as an example of "prediction". Also, even when "prediction (ie, intra prediction)" is indicated, "intra prediction" may be proposed as an example of "prediction".

In the present description, technical features that are individually described within one drawing may be implemented individually or may be implemented at the same time.

The following drawings were created to explain a specific example of the present description. Since the names of specific devices described in the drawings or the names of specific signals/messages/fields are presented by way of example, the technical features of the present description are not limited to the specific names used in the following drawings.

Figure 2:
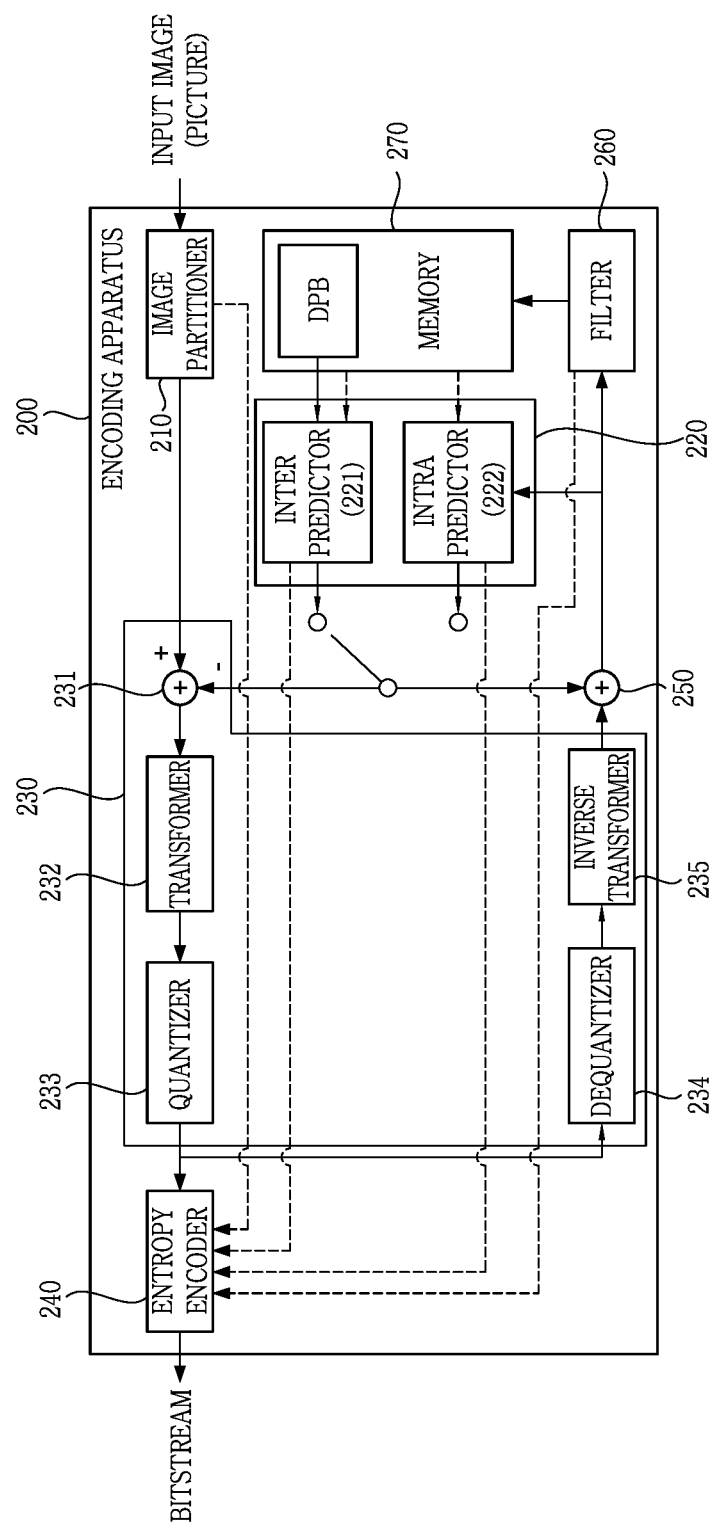
FIG. 2 is a schematic diagram illustrating a configuration of a video/image encoding apparatus to which the embodiment(s) of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (ex. An encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pa.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (ex. values of syntax elements, etc.) together or separately. Encoded information (ex. encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
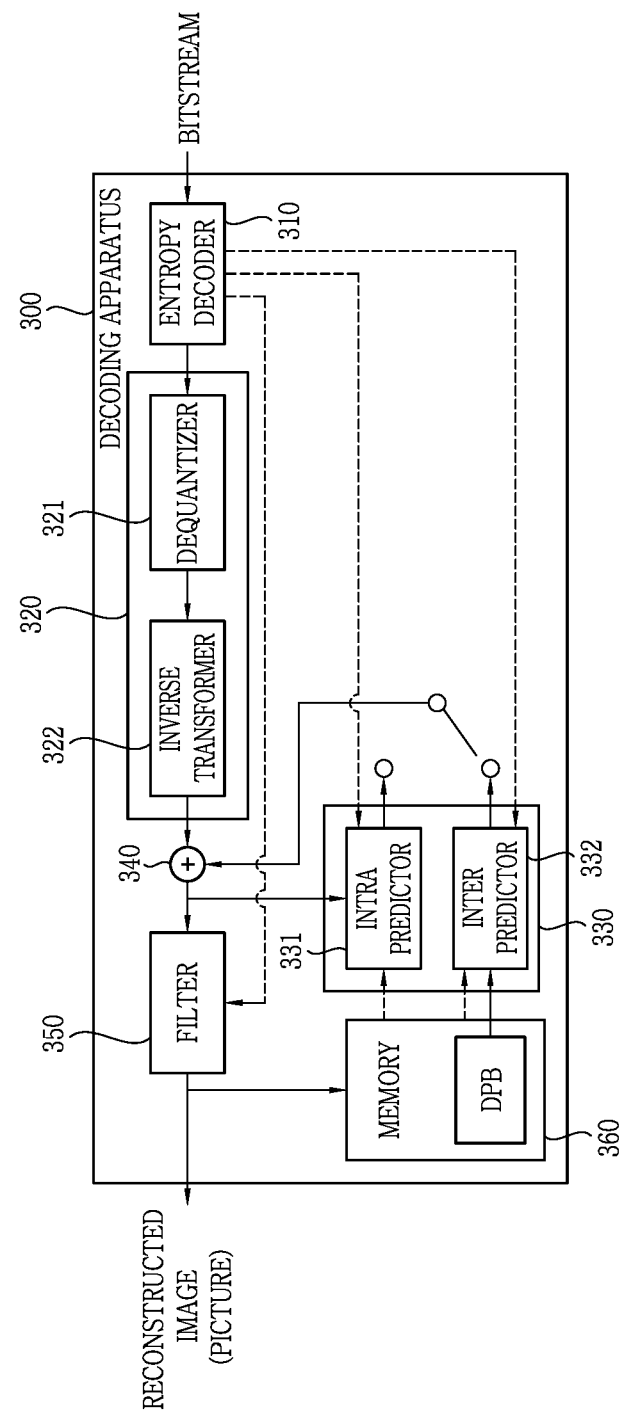
FIG. 3 is a schematic diagram illustrating a configuration of a video/image decoding apparatus to which the embodiment(s) of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350 may be configured by a hardware component (ex. A decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (ex. quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300. The same may also apply to the unit 332 and the intra predictor 331.

In the present disclosure, at least one of quantization/inverse quantization and/or transform/inverse transform may be omitted. When the quantization/inverse quantization is omitted, the quantized transform coefficients may be called transform coefficients. When the transform/inverse transform is omitted, the transform coefficients may be called coefficients or residual coefficients, or may still be called transform coefficients for uniformity of expression.

In the present disclosure, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or the information on the transform coefficient(s)), and scaled transform coefficients may be derived by inverse transforming (scaling) on the transform coefficients. Residual samples may be derived based on the inverse transforming (transforming) on the scaled transform coefficients. This may be applied/expressed in other parts of the present disclosure as well.

Figure 4:
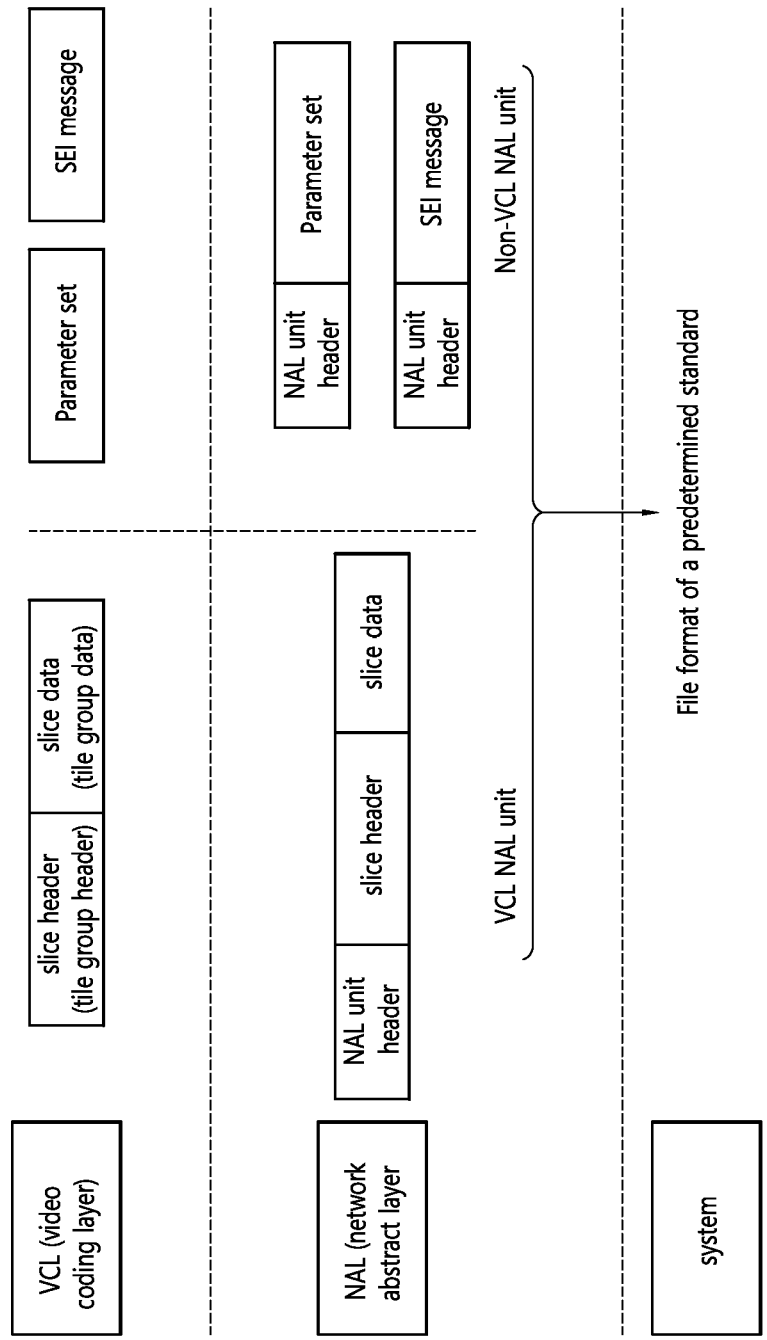
FIG. 4 schematically shows a hierarchical structure for a coded image/video.

FIG. 4 schematically shows a hierarchical structure for a coded image/video.

Referring to FIG. 4, the coded image/video is divided into a video coding layer (VCL) that handles decoding processing of the image/video and itself, a subsystem that transmits and stores coded information, and a network abstraction layer (NAL) that exists between them the VCL and the subsystem and is responsible for network adaptation functions.

In the VCL, VCL data including compressed video data (slice data) may be generated, or a Supplemental Enhancement Information (SEI) message additionally necessary for the video decoding process or a parameter set including information such as a picture parameter set (PPS), a sequence parameter set (SPS), a video parameter set (VPS) may be generated.

In the NAL, a NAL unit may be generated by adding header information (NAL unit header) to a raw byte sequence payload (RBSP) generated in the VCL. In this case, the RBSP refers to slice data, parameter set, SEI message, etc. generated in the VCL. The NAL unit header may include NAL unit type information specified according to RBSP data included in the corresponding NAL unit.

As shown in the figure, the NAL unit may be divided into a VCL NAL unit and a Non-VCL NAL unit according to the RBSP generated in the VCL. The VCL NAL unit may mean a NAL unit including information about an image (slice data), the Non-VCL NAL unit may mean a NAL unit including information (a parameter set or an SEI message) necessary for decoding the image.

The above-described VCL NAL unit and Non-VCL NAL unit may be transmitted through a network by attaching header information according to a data standard of a subsystem. For example, the NAL unit may be transformed into a data form of a predetermined standard such as H.266/VVC file format, Real-time Transport Protocol (RTP), Transport Stream (TS), and transmitted through various networks.

As described above, in the NAL unit, the NAL unit type may be specified according to the RBSP data structure included in the corresponding NAL unit, and information on this NAL unit type may be stored and signaled in the NAL unit header.

For example, the NAL unit may be largely classified into a VCL NAL unit type and a Non-VCL NAL unit type according to whether or not the NAL unit includes image information (slice data). The VCL NAL unit type may be classified according to properties and types of pictures included in the VCL NAL unit, and the Non-VCL NAL unit type may be classified according to a type of a parameter set.

The following is an example of the NAL unit type specified according to the type of parameter set included in the Non-VCL NAL unit type.

Adaptation Parameter Set (APS) NAL unit: a type for a NAL unit containing the APS Decoding Parameter Set (DPS) NAL unit: a type for a NAL unit containing the DPS Video Parameter Set (VPS) NAL unit: a type for a NAL unit containing the VPS Sequence Parameter Set (SPS) NAL unit: a type for a NAL unit containing the SPS PPS(Picture Parameter Set) NAL unit: a type for a NAL unit containing the PPS Picture header (PH) NAL unit: a type for a NAL unit containing the PH The above-described NAL unit types may have syntax information for the NAL unit type, and the syntax information may be stored and signaled in a NAL unit header. For example, the syntax information may be nal_unit_type, and NAL unit types may be specified by a nal_unit_type value.

Meanwhile, as described above, the encoding apparatus may perform various encoding methods such as, for example, exponential Golomb, context-adaptive variable length coding (CAVLC), and context-adaptive binary arithmetic coding (CABAC). In addition, the decoding apparatus may decode information in the bitstream based on a coding method such as the exponential Golomb coding, the CAVLC or the CABAC, and output a value of a syntax element required for image reconstruction and a quantized value of a transform coefficient related to a residual.

For example, the above-described coding methods may be performed as described below.

Figure 5:
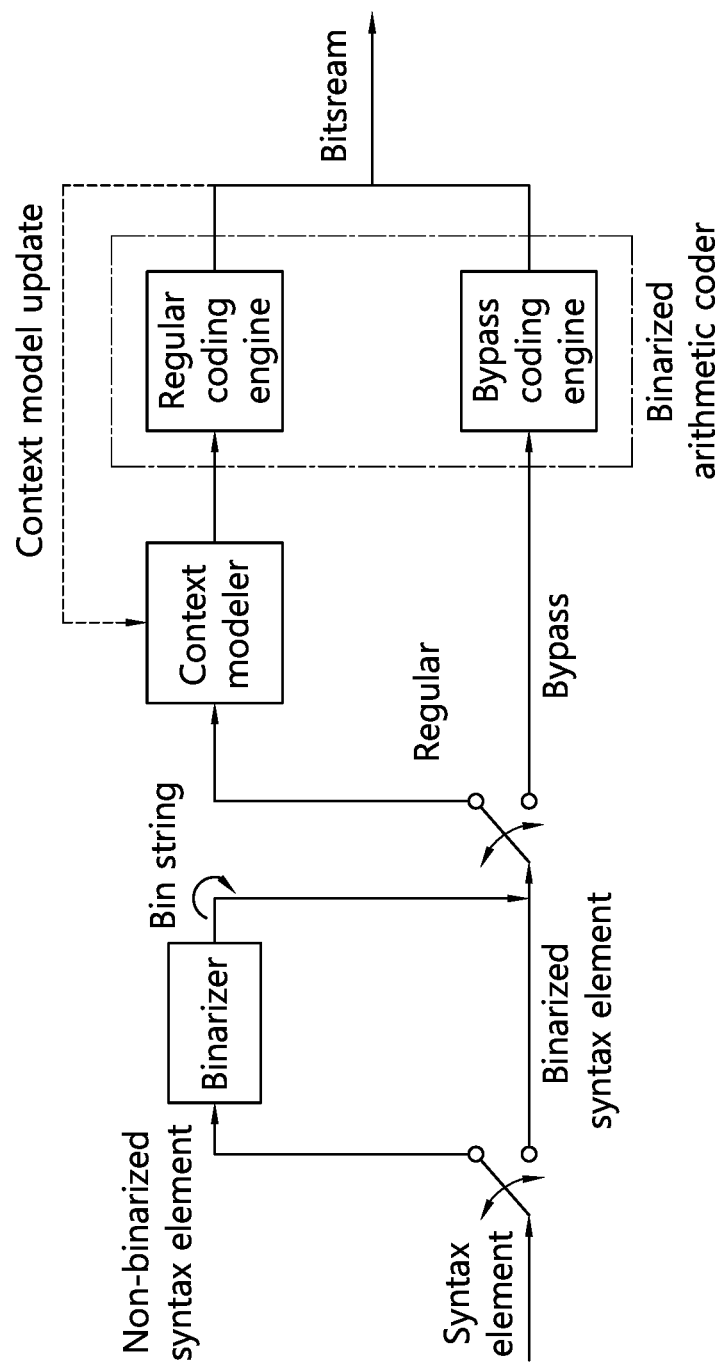
FIG. 5 schematically shows context-adaptive binary arithmetic coding (CABAC) for encoding a syntax element.

FIG. 5 schematically shows context-adaptive binary arithmetic coding (CABAC) for encoding a syntax element. For example, in the CABAC encoding process, when an input signal is a syntax element instead of a binary value, the encoding apparatus may convert the input signal into a binary value by binarizing the value of the input signal. In addition, when the input signal is already a binary value (ie, when a value of the input signal is a binary value), binarization may not be performed and may be bypassed. Here, each binary number 0 or 1 constituting a binary value may be referred to as a bin. For example, if the binary string after binarization is 110, each of 1, 1, and 0 is called one bin. The bin(s) for one syntax element may indicate a value of the syntax element.

Thereafter, the binarized bins of the syntax element may be input to a regular encoding engine or a bypass encoding engine. The regular encoding engine of the encoding apparatus may allocate a context model reflecting a probability value to the corresponding bin, and may encode the corresponding bin based on the allocated context model. The regular encoding engine of the encoding apparatus may update the context model for the corresponding bin after encoding for each bin. The encoded bin as described above may be referred to as a context-coded bin.

Meanwhile, when the binarized bins of the syntax element are input to the bypass encoding engine, they may be coded as follows. For example, the bypass encoding engine of the encoding apparatus omits a procedure of estimating a probability with respect to an input bin and a procedure of updating a probability model applied to the bin after encoding. When bypass encoding is applied, the encoding apparatus may encode the input bin by applying a uniform probability distribution instead of allocating the context model, thereby improving the encoding speed. The encoded bin as described above may be referred to as a bypass bin.

Entropy decoding may represent a process of performing the same process as the above-described entropy encoding in a reverse order.

For example, when a syntax element is decoded based on a context model, the decoding apparatus may receive a bin corresponding to the syntax element through a bitstream, may determine a context model using the syntax element and decoding information of a decoding target block or neighboring blocks, or information of symbols/bins decoded in the previous step, may derive a value of the syntax element by predicting the occurrence probability of the received bin according to the determined context model and performing arithmetic decoding of the bin. Thereafter, a context model of a next decoded bin may be updated with the determined context model.

Also, for example, when a syntax element is bypass decoded, the decoding apparatus may receive a bin corresponding to the syntax element through a bitstream, and may decode the input bin by applying a uniform probability distribution. In this case, the decoding apparatus may omit a procedure for deriving a context model of the syntax element and a procedure for updating a context model applied to the bin after decoding.

Also, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain) The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Intra prediction may refer to prediction that generates prediction samples for a current block based on reference samples in a picture to which the current block belongs (hereinafter, referred to as a current picture). When the intra prediction is applied to the current block, neighboring reference samples to be used for the intra prediction of the current block may be derived. The neighboring reference samples of the current block may include a sample adjacent to the left boundary of the current block of size nW×nH and a total of 2×nH samples adjacent to the bottom-left of the current block, a sample adjacent to the top boundary of the current block and a total of 2×nW samples adjacent to the top-right and a sample adjacent to the top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to the right boundary of the current block of size nW×nH, a total of nW samples adjacent to the bottom boundary of the current block and a sample adjacent to the bottom-right of the current block.

However, some of the neighboring reference samples of the current block have not yet been decoded or may not be available. In this case, the decoder may construct neighboring reference samples to be used for prediction by substituting unavailable samples with available samples. Alternatively, neighboring reference samples to be used for prediction may be configured through interpolation of available samples.

When the neighboring reference samples are derived, (i) a prediction sample may be derived based on the average or interpolation of neighboring reference samples of the current block, or (ii) the prediction sample may be derived based on a reference sample existing in a specific (prediction) direction with respect to a prediction sample among the neighboring reference samples of the current block. The case of (i) may be called a non-directional mode or a non-angular mode, and the case of (ii) may be called a directional mode or an angular mode.

In addition, the prediction sample may be generated through interpolation of a first neighboring sample located in the prediction direction of the intra prediction mode of the current block based on the prediction sample of the current block and a second neighboring sample located in a direction opposite to the prediction direction among the neighboring reference samples. The above-described case may be referred to as linear interpolation intra prediction (LIP). In addition, chroma prediction samples may be generated based on the luma samples using a linear model (LM). This case may be called an LM mode or a chroma component LM (CCLM) mode.

In addition, a temporary prediction sample of the current block is derived based on the filtered neighboring reference samples, and a prediction sample of the current block may also be derived by weighted summing the temporary prediction sample and at least one reference sample derived according to the intra prediction mode among the existing neighboring reference samples, that is, unfiltered neighboring reference samples. The above-described case may be referred to as position dependent intra prediction (PDPC).

In addition, a reference sample line with the highest prediction accuracy among neighboring multiple reference sample lines of the current block is selected, and a prediction sample is derived using a reference sample located in the prediction direction in the selected line. In this case, intra prediction encoding may be performed by indicating (signaling) the used reference sample line to the decoding apparatus. The above-described case may be referred to as multi-reference line intra prediction or MRL-based intra prediction.

In addition, the current block is divided into vertical or horizontal sub-partitions and intra prediction is performed based on the same intra prediction mode, but neighboring reference samples may be derived and used in units of the sub-partitions. That is, in this case, the intra prediction mode for the current block is equally applied to the sub-partitions, but the intra prediction performance may be improved in some cases by deriving and using the neighboring reference samples in units of the sub-partitions. This prediction method may be called intra-prediction based on intra sub-partitions (ISP).

The above-described intra prediction methods may be called intra prediction types to be distinguished from the intra prediction mode. The intra prediction types may be referred to by various terms such as intra prediction technique or additional intra prediction modes. For example, the intra prediction types (or additional intra prediction modes, etc.) may include at least one of the aforementioned LIP, PDPC, MRL, and ISP. A general intra prediction method excluding a specific intra prediction type such as LIP, PDPC, MRL, and ISP may be referred to as a normal intra prediction type. The normal intra prediction type may be generally applied when the above specific intra prediction type is not applied, and prediction may be performed based on the above-described intra prediction mode. Meanwhile, if necessary, post-processing filtering may be performed on the derived prediction sample.

Specifically, the intra prediction process may include an intra prediction mode/type determination step, neighboring reference samples derivation step, and an intra prediction mode/type based prediction sample derivation step. In addition, if necessary, a post-filtering step may be performed on the derived prediction sample.

Figure 6:
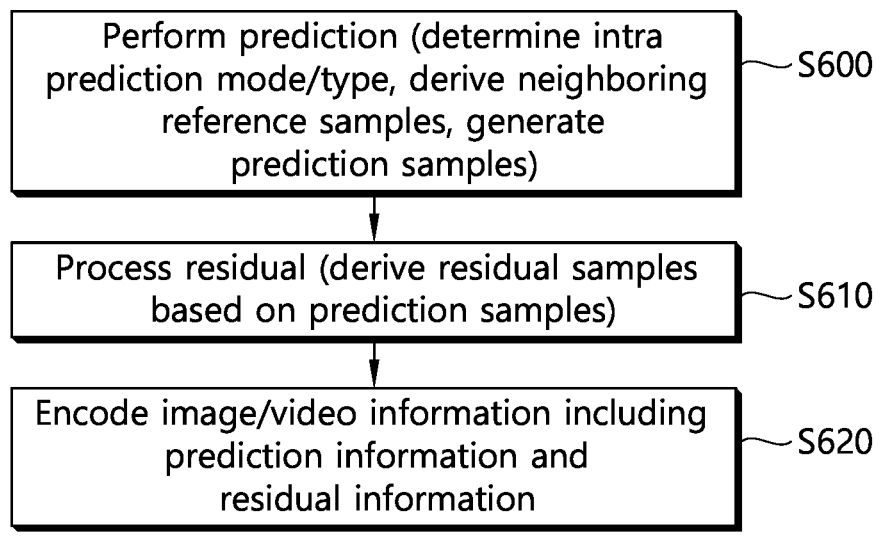
FIG. 6 illustrates an example of an intra prediction-based video/image encoding method.

FIG. 6 illustrates an example of an intra prediction-based video/image encoding method.

Referring to FIG. 6, the encoding device performs intra prediction on the current block S600. The encoding device derives an intra prediction mode/type for the current block, derives neighboring reference samples of the current block, generates prediction samples in the current block based on the intra prediction mode/type and the neighboring reference samples. Here, the intra prediction mode/type determination, neighboring reference samples derivation, and prediction samples generation procedures may be performed simultaneously, or one procedure may be performed before another procedure. The encoding device may determine a mode/type applied to the current block from among a plurality of intra prediction modes/types. The encoding device may compare RD costs for the intra prediction mode/types and determine an optimal intra prediction mode/type for the current block.

Meanwhile, the encoding device may perform a prediction sample filtering procedure. The prediction sample filtering may be referred to as post filtering. Some or all of the prediction samples may be filtered by the prediction sample filtering procedure. In some cases, the prediction sample filtering procedure may be omitted.

The encoding device generates residual samples for the current block based on the (filtered) prediction samples S610. The encoding device may compare the prediction samples in the original samples of the current block based on the phase and derive the residual samples.

The encoding device may encode image information including information on the intra prediction (prediction information) and residual information on the residual samples S620. The prediction information may include the intra prediction mode information and the intra prediction type information. The encoding device may output encoded image information in the form of a bitstream. The output bitstream may be transmitted to the decoding device through a storage medium or a network.

The residual information may include residual coding syntax, which will be described later. The encoding device may transform/quantize the residual samples to derive quantized transform coefficients. The residual information may include information on the quantized transform coefficients.

Meanwhile, as described above, the encoding device may generate a reconstructed picture (including reconstructed samples and reconstructed blocks). To this end, the encoding device may derive (modified) residual samples by performing inverse quantization/inverse transformation on the quantized transform coefficients again. The reason for performing the inverse quantization/inverse transformation again after transforming/quantizing the residual samples in this way is to derive the same residual samples as the residual samples derived in the decoding device as described above. The encoding device may generate a reconstructed block including reconstructed samples for the current block based on the prediction samples and the (modified) residual samples. A reconstructed picture for the current picture may be generated based on the reconstructed block. As described above, an in-loop filtering procedure may be further applied to the reconstructed picture.

Figure 7:
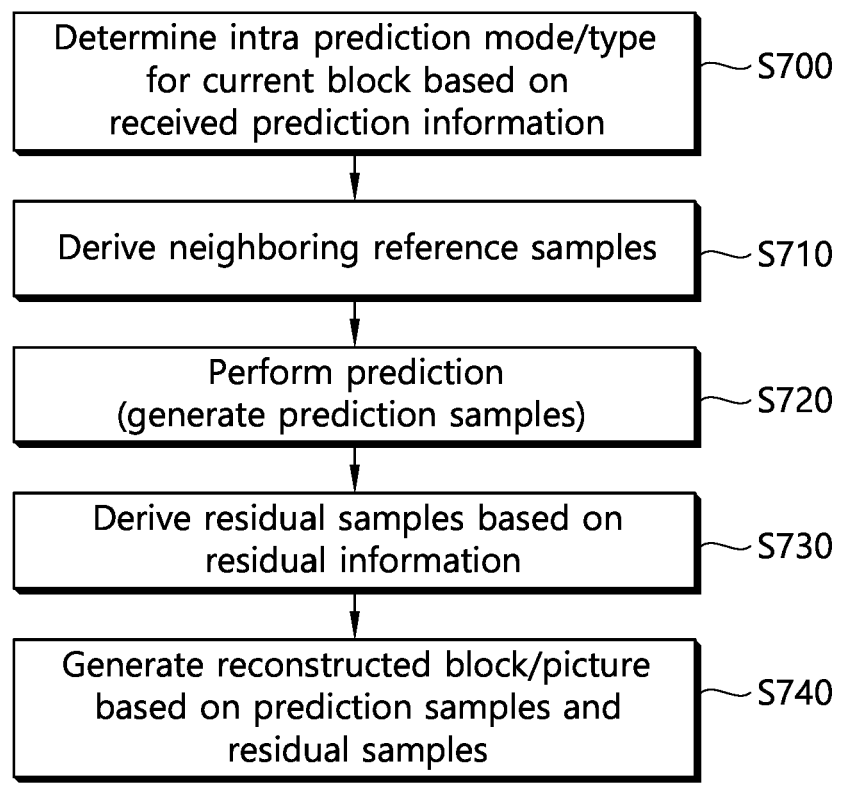
FIG. 7 illustrates an example of an intra prediction-based video/image encoding method.

FIG. 7 illustrates an example of an intra prediction-based video/image encoding method.

The decoding device may perform an operation corresponding to the operation performed by the encoding apparatus.

Prediction information and residual information may be obtained from a bitstream. Residual samples for the current block may be derived based on the residual information. Specifically, transform coefficients may be derived by performing inverse quantization based on the quantized transform coefficients derived based on the residual information, residual samples for the current block may be derived by performing inverse transform on the transform coefficients.

Specifically, the decoding device may derive the intra prediction mode/type for the current block based on the received prediction information (intra prediction mode/type information) S700. The decoding device may derive neighboring reference samples of the current block S710. The decoding device generates prediction samples in the current block based on the intra prediction mode/type and the neighboring reference samples S720. In this case, the decoding device may perform a prediction sample filtering procedure. The Predictive sample filtering may be referred to as post filtering. Some or all of the prediction samples may be filtered by the prediction sample filtering procedure. In some cases, the prediction sample filtering procedure may be omitted.

The decoding device generates residual samples for the current block based on the received residual information S730. The decoding device may generate reconstructed samples for the current block based on the prediction samples and the residual samples, and may derive a reconstructed block including the reconstructed samples S740. A reconstructed picture for the current picture may be generated based on the reconstructed block. As described above, an in-loop filtering procedure may be further applied to the reconstructed picture.

The intra prediction mode information may include, for example, flag information (ex. intra_luma_mpm_flag) indicating whether MPM (most probable mode) is applied to the current block or whether a remaining mode is applied, and, when the MPM is applied to the current block, the prediction mode information may further include index information (eg, intra_luma_mpm_idx) indicating one of the intra prediction mode candidates (MPM candidates). The intra prediction mode candidates (MPM candidates) may be constructed of an MPM candidate list or an MPM list. In addition, when the MPM is not applied to the current block, the intra prediction mode information includes remaining mode information (ex. intra_luma_mpm_remainder) indicating one of the remaining intra prediction modes except for the intra prediction mode candidates (MPM candidates). The decoding device may determine the intra prediction mode of the current block based on the intra prediction mode information.

Also, the intra prediction type information may be implemented in various forms. For example, the intra prediction type information may include intra prediction type index information indicating one of the intra prediction types. As another example, the intra prediction type information may include at least one of reference sample line information (ex. intra_luma_ref_idx) representing whether the MRL is applied to the current block and, if applied, which reference sample line is used, ISP flag information representing whether the ISP is applied to the current block (ex. intra_subpartitions_mode_flag), ISP type information indicating a split type of subpartitions when the ISP is applied (ex. intra_subpartitions_split_flag), flag information representing whether the PDPC is applied or flag information representing whether the LIP is applied. Also, the intra prediction type information may include a MIP flag representing whether matrix-based intra prediction (MIP) is applied to the current block.

The intra prediction mode information and/or the intra prediction type information may be encoded/decoded through a coding method described in the present disclosure. For example, the intra prediction mode information and/or the intra prediction type information may be encoded/decoded through entropy coding (eg, CABAC, CAVLC).

Figure 8:
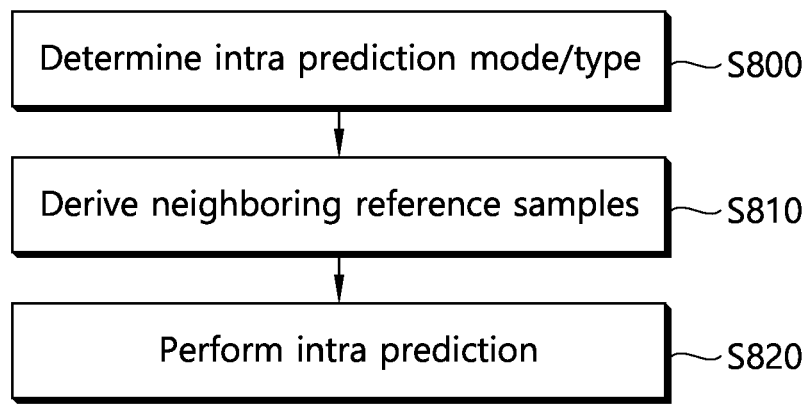
FIG. 8 schematically shows an intra prediction procedure.

FIG. 8 schematically shows an intra prediction procedure.

Referring to FIG. 8, as described above, the intra prediction procedure may include a step of determinating an intra prediction mode/type, a step of deriving neighboring reference samples, and a step of performing intra prediction (generating a prediction sample). The intra prediction procedure may be performed by the encoding device and the decoding device as described above. In the present disclosure, a coding device may include the encoding device and/or the decoding device.

Referring to FIG. 8, the coding device determines an intra prediction mode/type S800.

The encoding device may determine an intra prediction mode/type applied to the current block from among the various intra prediction modes/types described above, and may generate prediction related information. The prediction related information may include intra prediction mode information representing an intra prediction mode applied to the current block and/or intra prediction type information representing an intra prediction type applied to the current block. The decoding device may determine an intra prediction mode/type applied to the current block based on the prediction related information.

The intra prediction mode information may include, for example, flag information (ex. intra_luma_mpm_flag) representing whether a most probable mode (MPM) is applied to the current block or a remaining mode is applied, and the When the MPM is applied to the current block, the prediction mode information may further include index information (eg, intra_luma_mpm_idx) indicating one of the intra prediction mode candidates (MPM candidates). The intra prediction mode candidates (MPM candidates) may be constructed of an MPM candidate list or an MPM list. In addition, when the MPM is not applied to the current block, the intra prediction mode information may further include remaining mode information (ex. intra_luma_mpm_remainder) indicating one of the remaining intra prediction modes except for the intra prediction mode candidates (MPM candidates). The decoding device may determine the intra prediction mode of the current block based on the intra prediction mode information.

In addition, the intra prediction type information may be implemented in various forms. For example, the intra prediction type information may include intra prediction type index information indicating one of the intra prediction types. As another example, the intra prediction type information may include at least one of reference sample line information (ex. intra_luma_ref_idx) representing whether the MRL is applied to the current block and, if applied, which reference sample line is used, ISP flag information representing whether the ISP is applied to the current block (ex. intra_subpartitions_mode_flag), ISP type information indicating a split type of subpartitions when the ISP is applied (ex. intra_subpartitions_split_flag), flag information representing whether the PDPC is applied or flag information representing whether the LIP is applied. Also, the intra prediction type information may include a MIP flag representing whether matrix-based intra prediction (MIP) is applied to the current block.

For example, when intra prediction is applied, an intra prediction mode applied to the current block may be determined using an intra prediction mode of a neighboring block. For example, the coding device may select one of most probable mode (MPM) candidates in the MPM list derived based on additional candidate modes and/or an intra prediction mode of the neighboring block (eg, the left and/or top neighboring block) of the current block, or select one of the remaining intra prediction modes not included in the MPM candidates (and planar mode) based on the MPM remainder information (remaining intra prediction mode information). The MPM list may be configured to include or not include the planner mode as a candidate. For example, when the MPM list includes a planner mode as a candidate, the MPM list may have 6 candidates, and when the MPM list does not include a planner mode as a candidate, the MPM list may have 5 candidates. When the MPM list does not include the planar mode as a candidate, a not planar flag (ex. intra_luma_not_planar_flag) representing whether the intra prediction mode of the current block is not the planar mode may be signaled. For example, the MPM flag may be signaled first, and the MPM index and not planar flag may be signaled when the value of the MPM flag is 1. Also, the MPM index may be signaled when the value of the not planner flag is 1. Here, the fact that the MPM list is configured not to include the planner mode as a candidate is that the planner mode is always considered as MPM rather than that the planner mode is not MPM, thus, the flag (not planar flag) is signaled first to check whether it is the planar mode.

For example, whether the intra prediction mode applied to the current block is among the MPM candidates (and the planar mode) or the remaining modes may be indicated based on the MPM flag (eg, intra_luma_mpm_flag). The MPM flag with a value of 1 may indicate that the intra prediction mode for the current block is within MPM candidates (and planar mode), and The MPM flag with a value of 0 may indicate that the intra prediction mode for the current block is not within MPM candidates (and planar mode). The not planar flag (ex. intra_luma_not_planar_flag) with a value of 0 may indicate that the intra prediction mode for the current block is a planar mode, and the not planar flag with a value of 1 may indicate that the intra prediction mode for the current block is not the planar mode. The MPM index may be signaled in the form of an mpm_idx or intra_luma_mpm_idx syntax element, and the remaining intra prediction mode information may be signaled in the form of a rem_intra_luma_pred_mode or intra_luma_mpm_remainder syntax element. For example, the remaining intra prediction mode information may indicate one of the remaining intra prediction modes not included in the MPM candidates (and planar mode) among all intra prediction modes by indexing in the order of prediction mode number. The intra prediction mode may be an intra prediction mode for a luma component (sample). Hereinafter, the intra prediction mode information may include at least one of the MPM flag (ex. intra_luma_mpm_flag), the not planar flag (ex. intra_luma_not_planar_flag), the MPM index (ex. mpm_idx or intra_luma_mpm_idx), or the remaining intra prediction mode information (rem_intra_luma_luma_mpm_mode or intra_luma_mpminder). In the present disclosure, the MPM list may be referred to by various terms such as an MPM candidate list and candModeList.

When the MIP is applied to the current block, a separate MPM flag (ex. intra_mip_mpm_flag) for the MIP, an MPM index (ex. intra_mip_mpm_idx), and remaining intra prediction mode information (ex. intra_mip_mpm_remainder) may be signaled, and the not planar flag may not be signaled.

In other words, in general, when a block partition for an image is performed, the current block to be coded and a neighboring block have similar image characteristics. Therefore, there is a high probability that the current block and the neighboring block have the same or similar intra prediction mode. Accordingly, the encoder may use the intra prediction mode of the neighboring block to encode the intra prediction mode of the current block.

The coding device may construct a most probable modes (MPM) list for the current block. The MPM list may be referred to as the MPM candidate list. Here, the MPM may refer to modes used to improve coding efficiency in consideration of the similarity between the current block and the neighboring blocks during intra prediction mode coding. As described above, the MPM list may be constructed to include the planar mode, or may be constructed to exclude the planar mode. For example, when the MPM list includes the planar mode, the number of candidates in the MPM list may be 6. And, when the MPM list does not include the planar mode, the number of candidates in the MPM list may be 5.

The encoding device may perform prediction based on various intra prediction modes, and may determine an optimal intra prediction mode based on rate-distortion optimization (RDO) based thereon. In this case, the encoding device may determine the optimal intra prediction mode by using only the MPM candidates and planar mode configured in the MPM list, or by further using the remaining intra prediction modes as well as the MPM candidates and planar mode configured in the MPM list. Specifically, for example, if the intra prediction type of the current block is a specific type (ex. LIP, MRL, or ISP) other than the normal intra prediction type, the encoding device may determine the optimal intra prediction mode by considering only the MPM candidates and the planar mode as intra prediction mode candidates for the current block. That is, in this case, the intra prediction mode for the current block may be determined only from among the MPM candidates and the planar mode, and in this case, encoding/signaling of the MPM flag may not be performed. In this case, the decoding device may infer that the MPM flag is 1 without separately signaling the MPM flag.

Meanwhile, in general, when the intra prediction mode of the current block is not the planar mode and is one of the MPM candidates in the MPM list, the encoding device generates an MPM index (mpm idx) indicating one of the MPM candidates. when the intra prediction mode of the current block is not included in the MPM list, the encoding device generates MPM reminder information (remaining intra prediction mode information) indicating the same mode as the intra prediction mode of the current block among the remaining intra prediction modes not included in the MPM list (and planar mode). The MPM reminder information may include, for example, an intra_luma_mpm_remainder syntax element.

The decoding device obtains intra prediction mode information from the bitstream. As described above, the intra prediction mode information may include at least one of an MPM flag, a not planner flag, an MPM index, and MPM remaster information (remaining intra prediction mode information). The decoding device may construct the MPM list. The MPM list is constructed the same as the MPM list constructed in the encoding device. That is, the MPM list may include intra prediction modes of neighboring blocks, or may further include specific intra prediction modes according to a predetermined method.

The decoding device may determine the intra prediction mode of the current block based on the MPM list and the intra prediction mode information. For example, when the value of the MPM flag is 1, the decoding device may derive the planar mode as the intra prediction mode of the current block (based on not planar flag) or derive the candidate indicated by the MPM index from among the MPM candidates in the MPM list as the intra prediction mode of the current block. Here, the MPM candidates may represent only candidates included in the MPM list, or may include not only candidates included in the MPM list but also the planar mode applicable when the value of the MPM flag is 1.

As another example, when the value of the MPM flag is 0, the decoding device may derive an intra prediction mode indicated by the remaning intra prediction mode information (which may be referred to as mpm remainder information) among the remaining intra prediction modes not included in the MPM list and the planner mode as the intra prediction mode of the current block. Meanwhile, as another example, when the intra prediction type of the current block is a specific type (ex. LIP, MRL or ISP, etc.), the decoding device may derive a candidate indicated by the MPM flag in the planar mode or the MPM list as the intra prediction mode of the current block without parsing/decoding/checking the MPM flag.

The coding device derives neighboring reference samples of the current block S810. When intra prediction is applied to the current block, the neighboring reference samples to be used for the intra prediction of the current block may be derived. The neighboring reference samples of the current block may include a sample adjacent to the left boundary of the current block of size nW×nH and a total of 2×nH samples adjacent to the bottom-left of the current block, a sample adjacent to the top boundary of the current block and a total of 2×nW samples adjacent to the top-right and a sample adjacent to the top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to the right boundary of the current block of size nW×nH, a total of nW samples adjacent to the bottom boundary of the current block and a sample adjacent to the bottom-right of the current block.

On the other hand, when the MRL is applied (that is, when the value of the MRL index is greater than 0), the neighboring reference samples may be located on lines 1 to 2 instead of line 0 adjacent to the current block on the left/top side, and in this case, the number of the neighboring reference samples may be further increased. Meanwhile, when the ISP is applied, the neighboring reference samples may be derived in units of sub-partitions.

The coding device derives prediction samples by performing intra prediction on the current block S820. The coding device may derive the prediction samples based on the intra prediction mode/type and the neighboring samples. The coding device may derive a reference sample according to an intra prediction mode of the current block among neighboring reference samples of the current block, and may derive a prediction sample of the current block based on the reference sample.

Meanwhile, according to an embodiment, a block differential pulse coded modulation (BDPCM) technique may be used. The BDPCM may also be called RDPCM (quantized residual block-based Delta Pulse Code Modulation).

When predicting a block by applying BDPCM, reconstructed samples may be utilized to predict a row or column of the block line-by-line. In this case, the used reference sample may be an unfiltered sample. a BDPCM direction may indicate whether vertical direction or horizontal direction prediction is used. That is, when the BDPCM is applied, a vertical direction or a horizontal direction may be selected as the BDPCM direction, and prediction may be performed in the BDPCM direction. A prediction error may be quantized in the spatial domain, and a sample may be reconstructed by adding the inverse-quantized prediction error to the prediction (i.e. the prediction sample). The prediction error may mean a residual. As an alternative to this BDPCM, a quantized residual domain BDPCM may be proposed, and the prediction direction or signaling may be the same as the BDPCM applied to the spatial domain. That is, the quantization coefficient itself may be accumulated like DPCM (Delta Pulse Code Modulation) through the quantized residual domain BDPCM, and then the residual may be reconstructed through inverse quantization. Accordingly, the quantized residual domain BDPCM may be used in the sense of applying DPCM in the residual coding state. The quantized residual domain used below is the one in which the derived residual based on the prediction is quantized without transform, which means the domain for quantized residual samples. For example, the quantized residual domain may include quantized residuals (or quantized residual coefficients) to which transform skip is applied, ie, transform is skipped but quantization is applied for the residual samples. Or, for example, the quantized residual domain may include quantized transform coefficients.

For a block of M×N size, It may be assumed that the residual derived using a prediction value derived by performing intra prediction in the horizontal direction using unfiltered samples among left or top boundary samples (i.e., left neighboring samples or top neighboring samples) (copy the left neighboring sample line to the prediction block line-by-line) or obtained by performing intra prediction in the vertical direction (copy the top neighboring sample line to the prediction block line-by-line) is r(i,j)(0≤i≤M−1, 0≤j≤N−1). Here, M may represent a row or height, and N may represent a column or width. And, it may be assumed that the quantized value of the residual r(i,j) is Q(r(i,j)) (0≤i≤M−1, 0≤j≤N−1). Here, the residual means a difference value between the original block and the predicted block value.

Then, if the BDPCM is applied to the quantized residual samples, a modified array $\tilde{R}$ of M×N having $\tilde{r}_{i,j}$ as the configuration can be derived.

For example, when vertical BDPCM is signaled (i.e., when vertical BDPCM is applied), $\tilde{r}_{i,j}$ may be derived as in the following equation.

$$\tilde{r}_{i,j} = \begin{cases} Q(r_{i,j}), & i=0,\ 0 \le j \le (N-1) \\ Q(r_{i,j}) - Q(r_{(i-1),j}), & 1 \le i \le (M-1),\ 0 \le j \le (N-1) \end{cases}. \quad \text{[Equation 1]}$$

That is, for example, when vertical BDPCM is applied, the encoding device may perform vertical intra prediction based on top neighboring samples, and quantized residual samples for the current block may be derived as in Equation 1 above. Referring to Equation 1 above, a quantized residual sample of rows other than the first row of the current block may be derive as a difference between the quantized value for the corresponding position and the quantized value for the position of the previous row of the corresponding position (i.e., the top neighboring position of the corresponding position).

In addition, when similarly applied to horizontal prediction (that is, when BDPCM in the horizontal direction is applied), the residual quantized samples may be derived as in the following equation.

$$\tilde{r}_{i,j} = \begin{cases} Q(r_{i,j}), & 0 \le i \le (M-1), j = 0, \\ Q(r_{i,j}) - Q(r_{i,(j-1)}), & 0 \le i \le (M-1), 1 \le j \le (N-1) \end{cases}$$ [Equation 2]

That is, for example, when horizontal BDPCM is applied, the encoding device may perform horizontal intra prediction based on left neighboring samples, and quantized residual samples for the current block may be derived as in Equation 2 above. Referring to Equation 2 above, a quantized residual sample of columns other than the first column of the current block may be derive as a difference between the quantized value for the corresponding position and the quantized value for the position of the previous column of the corresponding position (i.e., the left neighboring position of the corresponding position).

The quantized residual sample ($\tilde{r}_{i,j}$) may be transmitted to the decoding device.

In the decoding apparatus, the above operation may be performed inversely to derive $Q(r(i,j))(0 \le i \le M-1, 0 \le j \le N-1)$.

The following equation may be applied for the vertical prediction.

$$Q(r_{i,j}) = \Sigma_{k=0}^{i} \tilde{r}_{k,j}, 0 \le i \le (M-1), 0 \le j \le (N-1)$$ [Equation 3]

In addition, the following equation may be applied for the horizontal prediction.

$$Q(r_{i,j}) = \Sigma_{k=0}^{i} \tilde{r}_{i,k}, 0 \le i \le (M-1), 0 \le j \le (N-1)$$ [Equation 4]

The dequantized quantized residual ($Q^{-1}(Q(r_{i,j}))$) is summed with the intra block prediction value to derive a reconstructed sample value.

The main advantage of this technique is that the inverse BDPCM may be performed by simply adding predictors at parsing the coefficients or even after parsing.

As described above, the BDPCM may be applied to a quantized residual domain, and the quantized residual domain may include a quantized residual (or quantized residual coefficients), in which case transform skip is applied to the residual. That is, when BDPCM is applied, transform may be skipped and quantization may be applied to the residual samples. Alternatively, the quantized residual domain may include quantized transform coefficients. A flag for whether BDPCM is available may be signaled at a sequence level (SPS), and this flag may be signaled only when it is signaled that a transform skip mode is enable in the SPS. The flag may be called a BDPCM enabled flag or an SPS BDPCM enabled flag.

When BDPCM is applied, intra prediction may be performed on the entire block by sample copy according to a prediction direction (ex. vertical prediction or horizontal prediction) similar to the intra prediction direction. The residual, which is the difference value between the original and the prediction block, is quantized by skipping the transform, and a delta value, that is, a difference value ($\tilde{r}_{i,j}$) between the quantized residual and a predictor in the horizontal or vertical direction (i.e., the quantized residual in the horizontal or vertical direction) may be coded.

If BDPCM is applicable, when the CU size is less than or equal to MaxTsSize (maximum transform skip block size) for luma samples, and the CU is coded with intra prediction, flag information may be transmitted at the CU level. The flag information may be referred to as a BDPCM flag. Here, MaxTsSize may mean the maximum block size for allowing the transform skip mode. The flag information may indicate whether conventional intra coding or BDPCM is applied. When BDPCM is applied, a BDPCM prediction direction flag indicating whether the prediction direction is a horizontal direction or a vertical direction may be transmitted. The BDPCM prediction direction flag may be referred to as a BDPCM direction flag. Thereafter, the block may be predicted through a conventional horizontal or vertical intra prediction process using an unfiltered reference sample. In addition, the residuals may be quantized, and a difference value between each quantized residual and its predictor, for example, between the already quantized residuals in the horizontal or vertical direction according to the BDPCM prediction direction, may be coded.

Meanwhile, the above-described BDPCM may be described in a standard document format as described later.

For example, a syntax element for the above-described BDPCM enabled flag and semantics for the syntax element may be represented as shown in the following tables.

TABLE 1

| | Descriptor |
|---|---|
| seq_parameter_set_rbsp( ) { | |
| (...) | |
| sps_transform_skip_enabled_flag | u(1) |
| if( sps_transform_skip_enabled_flag ) { | |
| sps_log2_transform_skip_max_size_minus2 | ue(v) |
| sps_bdpcm_enabled_flag | u(1) |
| } | |
| (...) | |
| } | |

TABLE 2

7.4.3.3 Sequence parameter set RBSP semantics (. . .)
sps_bdpcm_enabled_flag equal to 1 specifies that intra_bdpcm_luma_flag and intra_bdpcm_chroma_flag may be present in the coding unit syntax for intra coding units. sps_bdpcm_enabled_flag equal to 0 specifies that intra_bdpcm_luma_flag and intra_bdpcm_chroma_flag are not present in the coding unit syntax for intra coding units. When not present, the value of sps_bdpcm_enabled_flag is inferred to be equal to 0.
(. . .)

Table 1 shows sps_bdpcm_enabled_flag signaled in a sequence parameter set (SPS), and when the syntax element sps_bdpcm_enabled_flag is 1, the syntax element sps_bdpcm_enabled_flag may represent flag information representing whether BDPCM is applied to a coding unit in which intra prediction is performed, that is, "intra_bdpcm_luma_flag" and "intra_bdpcm_chroma_flag" are present in a coding unit. The syntax element sps_bdpcm_enabled_flag may be a syntax element for the above-described BDPCM enabled flag. Also, if the syntax element "sps_bdpcm_enabled_flag" is not present, its value may be inferred to be equal to 0.

Also, for example, the syntax elements for the BDPCM flag and the BDPCM direction flag and the semantics for the syntax elements may be shown as the following tables.

TABLE 3

| | Descriptor |
|---|---|
| coding unit( x0, y0, cbWidth, cbHeight, treeType ) { | |
|   if( tile group type != I \| \| sps ibc enabled flag ) { | |
|     if( treeType != DUAL TREE CHROMA ) | |
|       cu_skip_flag[ x0 ][ y0 ] | ae(v) |
|     if( cu skip flag[ x0 ][ y0 ] = = 0 && | |
|       tile group type != I ) | |
|       pred_mode_flag | ae(v) |
|     if( ( ( tile_group_type = = I && | |
|     cu_skip_flag[ x0 ][ y0 ] = =0 ) \| \| | |
|     ( tile_group_type != I && CuPredMode | |
| [ x0 ][ y0 ] != MODE_INTRA ) ) && | |
|     sps ibc enabled flag ) | |
|     pred mode ibc flag | ae(v) |
|   } | |
|   if( CuPredMode[ x0 ][ y0 ] = = MODE INTRA ) { | |
|     if( pred_mode_flag = = MODE_INTRA | |
| && ( cIdx == 0 ) && | |
|     ( cbWidth <= 32 ) && ( CbHeight <= 32 )) { | |
|       bdpcm flag[ x0 ][ y0 ] | ae(v) |
|     if( bdpcm flag[ x0 ][ y0 ] ) { | |
|       bdpcm dir flag[ x0 ][ y0 ] | ae(v) |
|     } | |
|     else { | |
|       (...) | |
| } | |

TABLE 4

| 7.4.7.5 Coding unit semantics |
|---|
| (. . .) |
| bdpcm_flag[ x0 ][ y0 ] equal to 1 specifies that a bdpcm_dir_flag is present in the coding unit including the luma coding block at the location ( x0, y0 ) |
| bdpcm_dir_flag[ x0 ][ y0 ] equal to 0 specifies that the prediction direction to be used in a bdpcm block is horizontal, otherwise it is vertical. |
| (. . .) |

The syntax element bdpcm_flag of Table 3 may represent whether BDPCM is applied to the current block. The syntax element bdpcm_flag may be a syntax element for the BDPCM flag. For example, when a value of bdpcm_flag is 1, the BDPCM may be applied to the current block, the transformation for the current block may be skipped, and bdpcm_dir_flag representing the prediction direction for the current block may be present. Also, for example, when the value of bdpcm_flag is 0, the BDPCM may not be applied to the current block. Also, for example, when the bdpcm_flag is not present, the value of the bdpcm_flag may be inferred to be equal to 0. The current block may be a coding block. The bdpcm_dir_flag may indicate a prediction direction for the current block. For example, referring to the Table 4, when the value of the bdpcm_dir_flag is 1, the prediction direction for the current block may be a vertical direction. When the value of the bdpcm_dir_flag is 0, the prediction direction for the current block may be a horizontal direction. The syntax element bdpcm_flag may be a syntax element for the above-described BDPCM flag, and the syntax element bdpcm_dir_flag may be a syntax element for the above-described BDPCM direction flag.

Also, for example, the above-described syntax elements for the BDPCM flag and the BDPCM direction flag may be separately signaled for the luma component and the chroma component. For example, semantics of the syntax elements may be shown as the following tables.

TABLE 5

| | Descriptor |
|---|---|
| coding unit( x0, y0, cbWidth, cbHeight, | |
| cqtDepth, treeType, modeType ) { | |
|   if( CuPredMode[ chType ][ x0 ][ y0 ] = = | |
| MODE_INTRA \| \| | |
|     CuPredMode[ chType ][ x0 ][ y0 ] = = | |
| MODE PLT ) { | |
|     if( treeType = = SINGLE TREE \| \| treeType = = | |
| DUAL TREE LUMA ) { | |
|       if( pred mode plt flag ) | |
|         palette coding( x0, y0, cbWidth, | |
|         cbHeight, treeType ) | |
|       else { | |
|         if( sps_bdpcm_enabled_flag && | |
|           cbWidth <= MaxTsSize && | |
|           cbHeight <= MaxTsSize ) | |
|           intra bdpcm luma flag | ae(v) |
|         if( intra bdpcm luma flag ) | |
|           intra_bdpcm_luma_dir_flag | ae(v) |
|         else { | |
|         ... | |
|         } | |
|       } | |
|     } | |
|   } | |
|   if( ( treeType = = SINGLE_TREE \| \| | |
| treeType = = DUAL_TREE_CHROMA ) && | |
|     ChromaArrayType != 0 ){ | |
|     if( pred mode plt flag && treeType = = | |
| DUAL TREE CHROMA ) | |
|       palette_coding( x0, y0, cbWidth / | |
| SubWidthC, cbHeight / SubHeightC, treeType ) | |
|     else if( !pred mode plt flag ) { | |
|       if( !cu act enabled flag ) { | |
|         if( cbWidth / SubWidthC <= MaxTsSize | |
| && cbHeight / SubHeightC <= MaxTsSize | |
|           && sps bdpcm enabled flag ) | |
|           intra_bdpcm_chroma_flag | ae(v) |
|         if( intra bdpcm chroma flag ) | |
|           intra_bdpcm_chroma_dir_flag | ae(v) |
|         else { | |
|         ... | |
|         } | |
|       } | |
|     } | |
|   } | |
| } | |

TABLE 6

7.4.11.5 Coding unit semantics (. . .)
intra_bdpcm_luma_flag equal to 1 specifies that BDPCM is applied to the current luma coding block at the location ( x0, y0 ), i.e. the transform is skipped, the intra luma prediction mode is specified by intra_bdpcm_luma_dir_flag. intra_bdpcm_luma_flag equal to 0 specifies that BDPCM is not applied to the current luma coding block at the location ( x0, y0 ).
When intra_bdpcm_luma_flag is not present it is inferred to be equal to 0.
The variable BdpcmFlag[ x ][ y ][ cIdx ] is set equal to intra_bdpcm_luma_flag for x = x0..x0 + cbWidth − 1, y = y0..y0 + cbHeight − 1 and cIdx = 0.
intra_bdpcm_luma_dir_flag equal to 0 specifies that the BDPCM prediction direction is horizontal. intra_bdpcm_luma_dir_flag equal to 1 specifies that the BDPCM prediction direction is vertical.
The variable BdpcmDir[ x ][ y ][ cIdx ] is set equal to intra_bdpcm_luma_dir_flag for x = x0..x0 + cbWidth − 1, y = y0..y0 + cbHeight − 1 and cIdx = 0.
(. . .)
intra_bdpcm_chroma_flag equal to 1 specifies that BDPCM is applied to the current chroma coding blocks at the location ( x0, y0 ), i.e. the transform is skipped, the intra chroma prediction mode is specified by intra_bdpcm_chroma_dir_flag. intra_bdpcm_chroma_flag equal to 0 specifies that BDPCM is not applied to the current chroma coding blocks at the location ( x0, y0 ).
When intra_bdpcm_chroma_flag is not present it is inferred to be equal to 0.
The variable BdpcmFlag[ x ][ y ][ cIdx ] is set equal to intra_bdpcm_chroma_flag for x = x0..x0 + cbWidth − 1, y = y0..y0 + cbHeight − 1 and cIdx = 1..2.
intra_bdpcm_chroma_dir_flag equal to 0 specifies that the BDPCM prediction direction is horizontal, intra_bdpcm_chroma_dir_flag equal to 1 specifies that the BDPCM prediction direction is vertical.
The variable BdpcmDir[ x ][ y ][ cIdx ] is set equal to intra_bdpcm_chroma_dir_flag for x = x0..x0 + cbWidth − 1, y = y0..y0 + cbHeight − 1 and cIdx = 1..2.
(. . .)

As described above, the syntax element intra_bdpcm_luma_flag of the Table 5 may represent whether the BDPCM is applied to the current luma block, and the intra_bdpcm_chroma_flag may represent whether the BDPCM is applied to the current luma block or the current chroma block. For example, when a value of the intra_bdpcm_luma_flag or the intra_bdpcm_chroma_flag is 1, transformation for the corresponding coding block may be skipped, and the prediction mode for the coding block may be set in the horizontal or vertical direction by the intra_bdpcm_luma_dir_flag or the intra_bdpcm_chroma_dir_flag representing the prediction direction. When the intra_bdpcm_luma_flag or the intra_bdpcm_chroma_flag is not present, a value of the intra_bdpcm_luma_flag or the intra_bdpcm_chroma_flag may be inferred to be equal to 0.

Also, for example, when the value of the intra_bdpcm_luma_dir_flag or the intra_bdpcm_chroma_dir_flag representing the prediction direction is 0, the intra_bdpcm_luma_dir_flag or the intra_bdpcm_chroma_dir_flag may represent that the BDPCM prediction direction is a horizontal direction, and when the value of the intra_bdpcm_luma_dir_flag or the intra_bdpcm_chroma_dir_flag is 1, the intra_bdpcm_luma_dir_flag or the intra_bdpcm_chroma_dir_flag may represent that the BDPCM prediction direction is a vertical direction.

Also, an example of the inverse quantization process when the BDPCM is applied may be shown in the following table.

TABLE 7

8.7.3 Scaling process for transform coefficients

Inputs to this process are:
- a luma location ( xTbY, yTbY ) specifying the top-left sample of the current luma transform block relative to the top-left luma sample of the current picture,
- a variable nTbW specifying the transform block width,
- a variable nTbH specifying the transform block height,
- a variable cIdx specifying the colour component of the current block,
- a variable bitDepth specifying the bit depth of the current colour component.

Output of this process is the (nTbW)x(nTbH) array d of scaled transform coefficients with elements d[ x ][ y ].
The quantization parameter qP is derived as follows:
- If cIdx is equal to 0, the following applies:
  $qP = Qp'_Y$ (8-1018)
- Otherwise, if cIdx is equal to 1, the following applies:
  $qP = Qp'_{Cb}$ (8-1019)
- Otherwise (cIdx is equal to 2), the following applies:
  $qP = Qp'_{Cr}$ (8-1020)

The variable rectNonTsFlag is derived as follows:
  rectNonTsFlag = ( ( ( Log2( nTbW ) + Log2( nTbH ) ) & 1 ) = = 1 && (8-1021)
    transform_skip_flag[ xTbY ][ yTbY ] = = 0 )

TABLE 7-continued

8.7.3 Scaling process for transform coefficients

The variables bdShift, rectNorm and bdOffset are derived as follows:
  bdShift = bitDepth + ( ( rectNonTsFlag ? 8 : 0 ) +        (8-1022)
  ( Log2( nTbW ) + Log2( nTbH ) ) / 2 ) − 5 + dep_quant_enabled_flag
  rectNorm = rectNonTsFlag ? 181 : 1        (8-1023)
  bdOffset = ( 1 << bdShift ) >> 1        (8-1024)
The list levelScale[ ] is specified as levelScale[ k ] = { 40, 45, 51, 57, 64, 72 } with k = 0..5.
For the derivation of the scaled transform coefficients d[ x ][ y ] with x = 0..nTbW − 1,
y = 0..nTbH − 1, the following applies:
- The intermediate scaling factor m[ x ][ y ] is set equal to 16.
- The scaling factor ls[x][y] is derived as follows:
  If dep_quant_enabled_flag is equal to 1, the following applies:
    ls[ x ][ y ] = ( m[ x ][ y ] * levelScale (qP + 1) % 6 ] ) << ( (qP + 1) / 6 )    (8-1025)
- Otherwise (dep_quant_enabled_flag is equal to 0), the following applies:
    ls[ x ][ y ] = ( m[ x ][ y ] * levelScale[ qP % 6 ] ) << ( qP / 6 )    (8-1026)
- The value dz[ x ][ y ] is derived as follows:
  - if bdpcm_flag[ xTbY ][ yTbY ]=1, dz[ x ][ y ] =
    bdpcm_dir_flag[ x0 ][ y0 ]==0 ? ( x==0 ?
    TransCoeffLevel[ xTbY ][ yTbY ][ cIdx ][ x ][ y ]:dz[ x-1 ][ y ] +
    TransCoeffLevel[ xTbY ][ yTbY ][ cIdx ][ x ][ y ]):(y==0 ?
    TransCoeffLevel[ xTbY ][ yTbY ][ cIdx ][ x ][ y ]:dz[ x ][ y-1 ] +
    TransCoeffLevel[ xTbY ][ yTbY ][ cIdx ][ x ][ y ])
  - other wise dz[x][y] = TransCoeffLevel[ xTbY ][ yTbY ][ cIdx ][ x ][ y ])
- The value dnc[ x ][ y ] is derived as follows:
  dnc[ x ][ y ] =        (8-1027)
    ( dz[x][y] * ls[ x ][ y ] * rectNorm +bdOffset ) >> bdShift
- The scaled transform coefficient d[ x ][ y ] is derived as follows:
  d[ x ][ y ] = Clip3( CoeffMin, CoeffMax, dnc[ x ][ y ] )        (8-1028)

Alternatively, an example of the inverse quantization process when the BDPCM is applied may be shown in the following table.

TABLE 8

8.7.3 Scaling process for transform coefficients

Inputs to this process are:
- a luma location ( xTbY, yTbY ) specifying the top-left sample of the current luma
  transform block relative to the top-left luma sample of the current picture,
- a variable nTbW specifying the transform block width,
- a variable nTbH specifying the transform block height,
- a variable predMode specifying the prediction mode of the coding unit,
- a variable cIdx specifying the colour component of the current block.
Output of this process is the (nTbW)x(nTbH) array d of sealed transform coefficients with
  elements d[ x ][ y ].
The quantization parameter qP and the variable QpActOffset are derived as follows:
- If cIdx is equal to 0, the following applies:
    qP = Qp'$_Y$        (1154)
    QpActOffset = cu_act_enabled_flag[ xTbY ][ yTbY ] ? −5 : 0        (1155)
- Otherwise, if TuCResMode[ xTbY ][ yTbY ] is equal to 2, the following applies:
    qP = Qp'$_{CbCr}$        (1156)
    QpActOffset = cu_act_enabled_flag[ xTbY ][ yTbY ] ? 1 : 0        (1157)
- Otherwise, if cIdx is equal to 1, the following applies:
    qP = Qp'$_{Cb}$        (1158)
    QpActOffset = cu_act_enabled_flag[ xTbY ][ yTbY ] ? 1 : 0        (1159)
  - Otherwise (cIdx is equal to 2), the following applies:
    qP = Qp'$_{Cr}$        (1160)
    QpActOffset = cu_act_enabled_flag[ xTbY ][ yTbY ] ? 3 : 0        (1161)
The quantization parameter qP is modified and the variables rectNonTsFlag and bdShift are
derived as follows:
- If transform_skip_flag[ xTbY ][ yTbY ][ cIdx ] is equal to 0, the following applies:
    qP = Clip3( 0, 63 + QpBdOffset, qP + QpActOffset)        (1162)
    rectNonTsFlag = ( ( ( Log2( nTbW ) + Log2( nTbH ) ) & 1 ) = = 1 ) ? 1 : 0        (1163)
    bdShift = BitDepth + rectNonTsFlag +        (1164)
        ( ( Log2( nTbW ) + Log2( nTbH ) ) / 2 ) − 5 + sh_dep_quant_enabled_flag
- Otherwise (transform_skip_flag[ xTbY ][ yTbY ][ cIdx ] is equal to 1 ), the following
  applies:
    qP = Clip3( QpPrimeTsMin, 63 + QpBdOffset, qP + QpActOffset )        (1165)
    rectNonTsFlag = 0        (1166)
    bdShift =
    10        (1167)

TABLE 8-continued

| 8.7.3 Scaling process for transform coefficients |
| --- |

The variable bdOffset is derived as follows:
    bdOffset = ( 1 << bdShift ) >> 1    (1168)
The list levelScale[ ][ ] is specified as levelScale[ j ][ k ] = { { 40, 45, 51, 57, 64, 72 },
{ 57, 64, 72, 80, 90, 102 } } with j = 0..1, k = 0..5.
The (nTbW)x(nTbH) array dz is set equal to the (nTbW)x(nTbH) array
TransCoeffLevel[ xTbY ][ yTbY ][ cIdx ].
For the derivation of the scaled transform coefficients d[ x ][ y ] with x = 0..nTbW − 1,
y = 0..nTbH − 1, the following applies:
- The intermediate scaling factor m[ x ][ y ] is derived as follows:
- If one or more of the following conditions are true, m[ x ][ y ] is set equal to 16:
  sh_explicit_scaling_list_used_flag is equal to 0.
  transform_skip_flag[ xTbY ][ yTbY ][ cIdx ] is equal to 1.
  sps_scaling_matrix_for_lfnst_disabled_flag is equal to 1 and ApplyLfnstFlag is equal
  to 1.
  sps_scaling_matrix_for_alternative_colour_space_disabled_flag is equal to 1 and
  sps_scaling_matrix_designated_colour_space_flag  is  equal  to
  cu_act_enabled_flag[ xTbY ][ yTbY ].
- Otherwise, the following applies:
- The variable id is derived based on predMode, cIdx, nTbW, and nTbH as specified in
  Table 38 and the variable log2MatrixSize is derived as follows:
    log2MatrixSize = ( id < 2 ) ? 1 : ( id < 8 ) ? 2 : 3    (1169)
- The scaling factor m[ x ][ y ] is derived as follows:
  m[ x ][ y ] = ScalingMatrixRec[ id ][ i ][ j ]
    with i = (x << log2MatrixSize ) >> Log2( nTbW ),
        j = ( y << log2MatrixSize ) >> Log2( nTbH )    (1170)
- If id is greater than 13 and both x and y are equal to 0, m [ 0 ][ 0 ] is further modified as
  follows:
    m[ 0 ][ 0 ] = ScalingMatrixDCRec[ id − 14 ]    (1171)
NOTE - A quantization matrix element m[ x ][ y ] can be zeroed out when any of the
following conditions is true
- x is greater than 31
- y is greater than 31
- The decoded tu is not coded by default transform mode (i.e. transform type is not equal
  to 0 ) and x is greater than 15
- The decoded tu is not coded by default transform mode (i.e. transform type is not equal
  to 0 ) and y is greater than 15
- The scaling factor ls[ x ][ y ] is derived as follows:
  - If  sh_dep_quant_enabled_flag  is  equal  to  1  and
    transform_skip_flag[ xTbY ][ yTbY ][ cIdx ] is equal to 0, the following applies:
      ls[ x ][ y ] = ( m[ x ][ y ] * levelScale[ rectNonTsFlag ][ (qP + 1) % 6 ] )
      << ( (qP + 1) / 6 )    (1172)
  - Otherwise  (sh_dep_quant_enabled_flag  is  equal  to  0  or
    transform_skip_flag[ xTbY ][ yTbY ][ cIdx ] is equal to 1), the following applies:
      ls[ x ][ y ] = ( m[ x ][ y ] * levelScale rectNonTsFlag ][ qP % 6 ]) << ( qP /
      6)    (1173)
- When BdpcmFlag[ xTbY ][ yYbY ][ cIdx ] is equal to 1, dz[ x ][ y ] is modified as
  follows:
  - If BdpcmDir[ xTbY ][ yYbY ][ cIdx ] is equal to 0 and x is greater than 0, the
    following applies:
      dz[ x ][ y ] = Clip3( CoeffMin, CoeffMax, dz[ x − 1 ][ y ] + dz[ x ][ y ])    (1174)
  - Otherwise, if BdpcmDir[ xTbY ][ yTbY ][ cIdx ] is equal to 1 and y is greater than 0,
    the following applies:
      dz[ x ][ y ] = Clip3( CoeffMin, CoeffMax, dz[ x ][ y − 1 ] + dz[ x ][ y ])    (1175)
- The value dnc[ x ][ y ] is derived as follows:
  dnc[ x ][ y ] = ( dz[ x ][ y ] * ls[ x ][ y ] +bdOffset ) >> bdShift    (1176)
- The scaled transform coefficient d[ x ][ y ] is derived as follows:
  d[ x ][ y ] = Clip3( CoeffMin, CoeffMax, dnc[ x ][ y ] )    (1177)

Referring to Table 7 or 8, when the value of the bdpcm_flag is 1, the inverse quantized residual value d[x][y] may be derived based on the intermediate variable dz[x][y]. Here, x is a horizontal coordinate that increases from left to right, y is a vertical coordinate that increases from top to bottom, and a position in a two-dimensional block may be expressed as (x, y). In addition, the position in the two-dimensional block indicates the (x, y) position when a top left position of the block is set to (0, 0).

For example, when the value of the bdpcm_dir_flag is 0, that is, when the horizontal BDPCM is applied, the variable dz[x][y] may be TransCoeffLevel[xTbY][yTbY][cIdx][x][y] when x is 0, dz[x][y] may be derived based on dz[x−1][y]+dz[x][y] when x is not 0. That is, when the horizontal BDPCM is applied (the value of bdpcm_dir_flag is 0), the variable dz[x][y] of a sample located in a first column where x is 0 is derived as TransCoeffLevel[xTbY][yTbY][cIdx][x][y] derived based on residual information of the sample, and the variable dz[x][y] of a sample located in a column other than the first column where x is not 0 is derived as the sum of dz[x−1][y] of a left neighboring sample of the sample and dz[x][y] of the sample. Here, dz[x][y] for the sample that is added to the dz[x−1][y] may be derived based on the signaled residual information for the sample.

In addition, for example, when the value of the bdpcm_dir_flag is 1, that is, the vertical BDPCM is applied, the variable dz[x][y] is derived based on dz[x][y−1]+dz[x][y]. That is, when the vertical BDPCM is applied (the value of bdpcm_dir_flag is 1), the variable dz[x][y] of a sample located in a first row where y is 0 is derived as TransCoeffLevel[xTbY][yTbY][cIdx][x][y] derived based on residual information of the sample, and the variable dz[x][y] of a sample located in a row other than the first row where y is not 0 is derived as the sum of dz[x][y−1] of a top neighboring sample of the sample and dz[x][y] of the sample. Here, dz[x][y] for the sample that is added to the dz[x][y−1] may be derived based on the signaled residual information for the sample.

As described above, a residual of a specific location may be derived based on the sum of a residual of the previous location (i.e., left or top) in the horizontal or vertical direction and a value received as residual information of the specific location. This is because, when the BDPCM is applied, a difference value between a residual sample value of the specific position (x, y) and a residual sample value of the previous position (i.e., (x−1, y) or (x, y−1)) in the horizontal or vertical direction is signaled as residual information.

Meanwhile, the present disclosure proposes the following method for a method of applying BDPCM between residual signals in the process of coding the transform skipped residual signal.

First, as described above, the BDPCM may be applied only when the prediction mode for the current block is the intra prediction mode, and intra prediction may be performed in the same direction as the direction in which the BDPCM is applied. That is, by performing line-by-line inter-residual prediction in the row or column direction, it is possible to reduce the size of the generated level and to reduce the generation of context coded bins necessary for coding the level, which can contribute to improving the throughput of the decoding apparatus. Also, as described above, the BDPCM syntax may be parsed in the CU level, and bdpcm_flag representing whether the BDPCM is applied or bdpcm_dir_flag representing whether a prediction is the row-direction prediction or column-direction prediction may be parsed sequentially. In addition, according to the existing BDPCM, if a block to which BDPCM is applied is referenced for decoding of a neighboring block or is referenced by other chroma components (Cb, Cr, etc.), the block to which the BDPCM is applied may be recognized as an intra prediction block and an intra prediction mode of the block to which BDPCM is applied may be derived as the intra prediction mode corresponding to index 0 of the most probable modes (MPM) list of the block to which the BDPCM is applied. That is, a neighboring block or a corresponding block of another chroma component may refer to the MPM candidate 0 of the block to which the BDPCM is applied as the intra prediction mode of the block to which the BDPCM is applied. However, according to the BDPCM, even though vertical intra prediction or horizontal intra prediction is performed by determining the prediction direction based on the BDPCM direction flag, if the intra prediction mode corresponding to index 0 of the MPM list is stored as the prediction mode of the current block, a difference between the intra prediction mode performed for actual prediction and the stored intra prediction mode may occur.

Thus, the present disclosure proposes a method of storing the intra prediction mode of the current block according to bdpcm_dir_flag (ie, the BDPCM direction flag), which is a syntax element of the BDPCM predicted current block. Accordingly, the stored intra prediction mode of the current block can be stored in the actual predicted direction, and through this, when constructing the MPM list by referring to the BDPCM block (ie, the current block) in the neighboring block or constructing the DM mode in the corresponding block of the chroma component, since coding may be performed using accurate neighboring information, prediction accuracy may be improved and coding efficiency may be improved.

Figure 9:
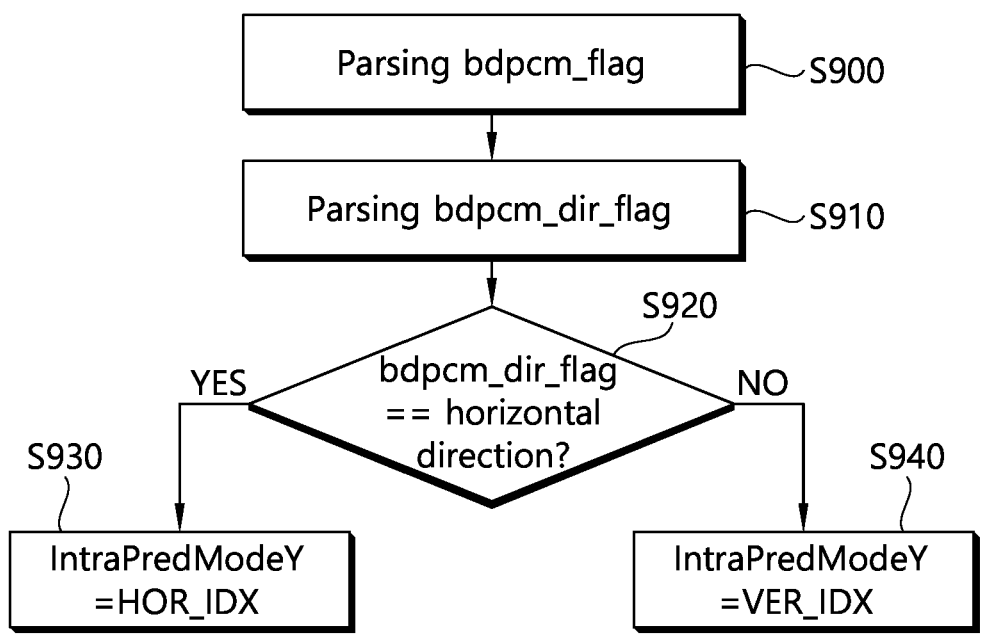
FIG. 9 illustrates an embodiment proposed in the present disclosure of determining the intra prediction mode of the current block to be stored based on the BDPCM direction flag.

FIG. 9 illustrates an embodiment proposed in the present disclosure of determining the intra prediction mode of the current block to be stored based on the BDPCM direction flag.

Referring to FIG. 9, the decoding apparatus may parse bdpcm_flag for the current block (S900). The bdpcm_flag may represent a syntax element of a BDPCM flag representing whether the BDPCM is applied to the current block. For example, when a value of the bdpcm_flag is 0, the BDPCM may not be applied to the current block. When the value of the bdpcm_flag is 1, the BDPCM may be applied to the current block, and bdpcm_dir_flag representing a prediction direction of the current block to which the BDPCM is applied may be present.

When the value of the bdpcm_flag is 1, the decoding apparatus may parse the bdpcm_dir_flag for the current block (S910). The bdpcm_dir_flag may represent a syntax element of a BDPCM direction flag representing the prediction direction of the current block.

The decoding apparatus may determine whether the value of the bdpcm_dir_flag represents a horizontal direction (S920). The decoding apparatus may derive the prediction direction of the current block based on the parsed value of bdpcm_dir_flag. For example, when the value of the bdpcm_dir_flag is 0, the bdpcm_dir_flag may represent that the prediction direction is a horizontal direction, and when the value of the bdpcm_dir_flag is 1, the bdpcm_dir_flag may represent that the prediction direction is a vertical direction.

When the bdpcm_dir_flag represents the horizontal direction, the decoding apparatus may store the intra prediction mode of the current block as a horizontal intra prediction mode (S930). For example, when the bdpcm_dir_flag represents the horizontal direction, that is, when the value of the bdpcm_dir_flag is 0, the decoding apparatus may set or store the intra prediction mode of the current block as the horizontal intra prediction mode. Here, IntraPredModeY illustrated in FIG. 9 may represent an intra prediction mode for a luma component of the current block, HOR_IDX may represent the horizontal intra prediction mode, and VER_IDX may represent the vertical intra prediction mode.

Also, when the bdpcm_dir_flag does not represent the horizontal direction, the decoding apparatus may store the intra prediction mode of the current block as a vertical intra prediction mode (S940). For example, when the bdpcm_dir_flag represents the vertical direction, that is, when the value of the bdpcm_dir_flag is 1, the decoding apparatus may set or store the intra prediction mode of the current block as the vertical intra prediction mode.

Figure 10:
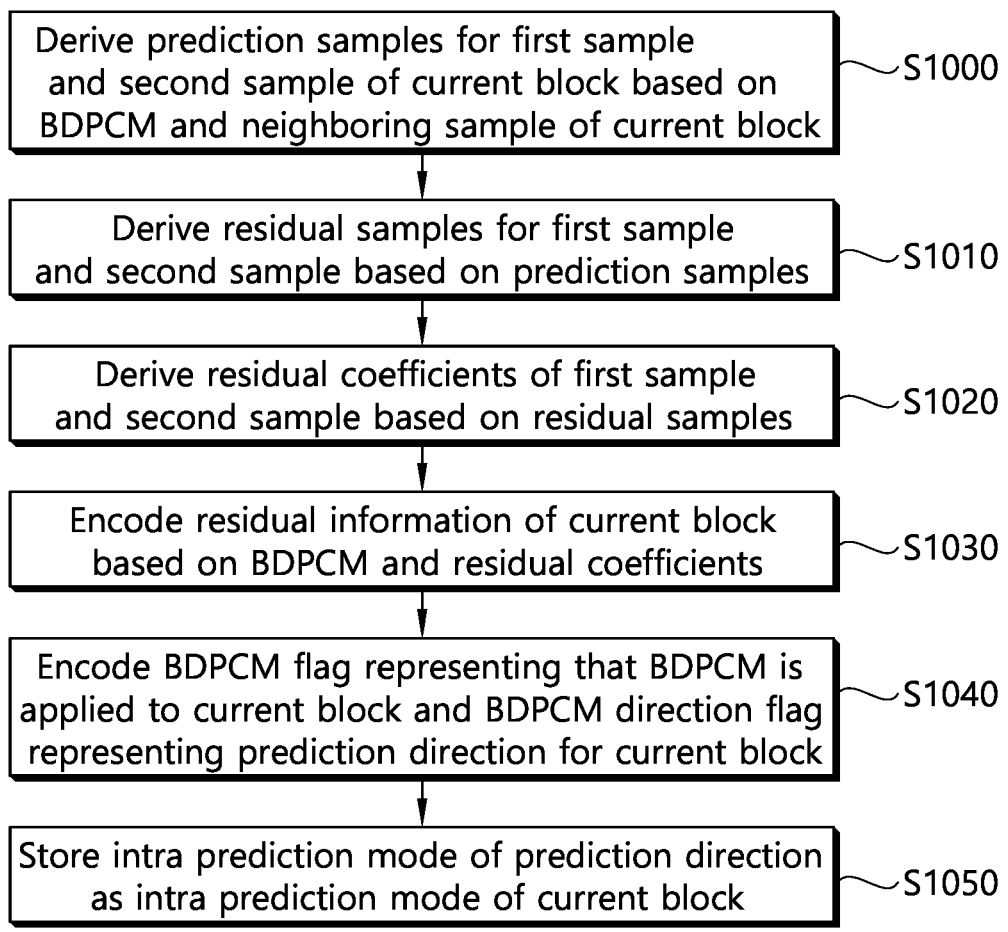
FIG. 10 schematically shows an image encoding method by an encoding apparatus according to the present document.

FIG. 10 schematically shows an image encoding method by an encoding apparatus according to the present document. The method disclosed in FIG. 10 may be performed by the encoding apparatus disclosed in FIG. 2. Specifically, for example, S1000 of FIG. 10 may be performed by the predictor of the encoding apparatus, S1010 to S1020 of FIG. 10 may be performed by the residual processor of the encoding apparatus, S1030 to S1040 may be performed by the entropy encoder of the encoding apparatus, S1050 may be performed by the memory of the encoding apparatus. Also, although not shown in the figure, a process for generating reconstructed samples and a reconstructed picture for the current block based on the prediction samples and the residual samples for the current block may be performed by the adder of the encoding apparatus.

The encoding apparatus derives prediction samples for a first sample and a second sample of a current block based on Block-based Delta Pulse Code Modulation (BDPCM) and a neighboring sample of the current block S1000.

The encoding apparatus may determine whether the BDPCM is applied to the current block and may determine a direction in which the BDPCM is performed. For example, the encoding apparatus may derive the prediction samples by performing intra prediction on the current block based on the prediction direction in which the BDPCM is performed. For example, the prediction direction may be a vertical direction or a horizontal direction, and a prediction sample for the current block may be generated based on an intra prediction mode according to the prediction direction.

For example, when the prediction direction for the current block is derived in the horizontal direction, the encoding apparatus may derive the prediction samples of the current block by performing intra prediction based on left neighboring samples of the current block. For example, when the prediction direction for the current block is derived in the horizontal direction, the encoding apparatus may derive the prediction samples of the current block based on left neighboring samples of the current block. For example, when the prediction direction for the current block is derived in the horizontal direction, the encoding apparatus may derive the prediction samples for the first sample and the second sample based on a left neighboring sample of the current block. For example, when the prediction direction for the current block is derived in the horizontal direction, the encoding apparatus may derive a sample value of a left neighboring sample of the same row as the first sample and the second sample as a sample value of the prediction sample. Also, for example, when the prediction direction for the current block is derived in the vertical direction, the encoding apparatus may derive the prediction samples of the current block based on top neighboring samples of the current block. For example, when the prediction direction for the current block is derived in the vertical direction, the encoding apparatus may derive the prediction samples of the current block based on top neighboring samples of the current block. For example, when the prediction direction for the current block is derived in the vertical direction, the encoding apparatus may derive a sample value of a top neighboring sample of the same column as the prediction sample as the sample value of the prediction sample. For example, when the prediction direction for the current block is derived in the vertical direction, the encoding apparatus may derive the prediction samples for the first sample and the second sample based on a top neighboring sample of the current block. For example, when the prediction direction for the current block is derived in the vertical direction, the encoding apparatus may derive a sample value of a top neighboring sample of the same column as the first sample and the second sample as a sample value of the prediction sample.

Meanwhile, a tree type of the current block may be divided into a single tree (SINGLE_TREE) or a dual tree (DUAL_TREE) based on whether a luma block and a corresponding chroma block have an individual partition structure. When the chroma block has the same partition structure as the luma block, it may be represented as the single tree, and when the chroma component block has a partition structure different from that of the luma block, it may be represented as the dual tree. According to an example, BDPCM may be individually applied to a luma block or a chroma block of the current block.

When the tree structure of the current block is the dual tree, BDPCM can be applied to only one component block, and even when the tree structure of the current block is the single tree structure, BDPCM may be applied to only one component block.

Alternatively, according to an example, the BDPCM may be applied only when a width of the current block is less than or equal to a first threshold and a height of the current block is less than or equal to a second threshold. The first threshold value and the second threshold value may be 32, or may be set to the maximum height or maximum width of a transform block in which the transform skip is performed.

The encoding apparatus derives residual samples for the first sample and the second sample based on the prediction samples S1010. For example, the encoding apparatus may derive the residual samples by subtracting an original sample for the current block and the prediction sample.

The encoding apparatus derives residual coefficients of the first sample and the second sample based on the residual samples S1020. For example, the encoding apparatus may derive residual coefficients of the current block based on the residual samples. For example, when the BDPCM is applied to the current block, the encoding apparatus may determine that transform is not applied to the current block. In this case, for example, the encoding apparatus may derive residual coefficients by performing quantization on the residual samples. Here, for example, a block to which the transform is not applied may be referred to as a transform skip block. That is, for example, the current block may be a transform skip block.

The encoding apparatus encodes residual information of the current block based on the BDPCM and the residual coefficients S1030. For example, the encoding apparatus may encode residual information for the residual coefficients. For example, the residual information may include residual information for the residual coefficients of the residual samples.

For example, the residual information may include syntax elements for the first sample representing a residual coefficient for the first sample, and syntax elements for the second sample representing a difference between the residual coefficient for the first sample and a residual coefficient for the second sample. For example, a difference between a residual coefficient value of a target sample (ex. the second sample) and a residual coefficient value of a left neighboring sample or a top neighboring sample of the target sample may be derived based on syntax elements for the target sample. For example, when a prediction direction of the current block is a horizontal direction, the difference between the residual coefficient value of the target sample (ex. the second sample) and the residual coefficient value of the left neighboring sample (ex. the first sample) of the target sample is derived based on the syntax elements for the target sample. That is, for example, when the prediction direction of the current block is the horizontal direction, the syntax elements for the target sample may represent the difference between the residual coefficient value of the target sample and the residual coefficient value of the left neighboring sample of the target sample. Also, for example, when the prediction direction of the current block is a vertical direction, the difference between the residual coefficient value of the target sample (ex. the second sample) and the residual coefficient value of the top neighboring sample (ex. the first sample) of the target sample is derived based on the syntax elements for the target sample. That is, for example, when the prediction direction of the current block is the vertical direction, the syntax elements for the target sample may represent the difference between the residual coefficient value of the target sample and the residual coefficient value of the top neighboring sample of the target residual sample. Also, when the target sample is located in a first row or column of the current block (ex. the first sample), the residual coefficient value of the target sample may be derived based on the syntax elements for the target sample. That is, when the target sample is located in the first row or column of the current block, the syntax elements for the target sample may represent the residual coefficient values of the target sample.

For example, the residual information may include syntax elements such as transform_skip_flag, last_sig_coeff_x_prefix, last_sig_coeff_y_prefix, last_sig_coeff_x_suffix, last_sig_coeff_y_suffix, coded_sub_block_flag, sig_coeff_flag, par_level_flag, abs_level_gt1_flag, abs_level_gtX_flag, abs_remainder, coeff_sign_flag, dec_abs_level and/or mts_idx.

Specifically, for example, the residual information may include a transform skip flag for the current block. The transform skip flag may represent whether the transform is applied to the current block. That is, the transform skip flag may represent whether the transform is applied to the residual coefficients of the current block. Also, for example, when the BDPCM is applied to the current block, the transform skip flag for the current block may not be signaled, and a value of the transform skip flag may be inferred to be equal to 1. That is, when the BDPCM is applied to the current block, the residual information may not include the transform skip flag for the current block, the value of the transform skip flag may be inferred to be equal to 1, and the current block may be a transform skip block. A syntax element representing the transform skip flag may be the transform_skip_flag.

Also, for example, the residual information may include position information representing a position of a last non-zero residual coefficient in a residual coefficient array of the current block. That is, the residual information may include position information representing the position of the last non-zero residual coefficient in a scanning order of the current block. The position information may include information representing a prefix of a column position of the last non-zero residual coefficient, and information representing a prefix of a row position of the last non-zero residual coefficient, information representing a suffix of the column position of the last non-zero residual coefficient and information representing a suffix of the row position of the last non-zero residual coefficient. Syntax elements for the position information may be last_sig_coeff_x_prefix, last_sig_coeff_y_prefix, last_sig_coeff_x_suffix, and last_sig_coeff_y_suffix. Meanwhile, a non-zero residual coefficient may be referred to as a significant coefficient. Also, for example, when the current block is a transform skip block, the residual information may not include position information representing a position of a last non-zero residual coefficient in a residual coefficient array of the current block.

Also, for example, the residual information may include a significant coefficient flag representing whether a residual coefficient of a target sample of the current block is a non-zero residual coefficient, a parity level flag for parity of a coefficient level for the residual coefficient, a first coefficient level flag representing whether the coefficient level is greater than a first threshold and a second coefficient level flag representing whether the coefficient level is greater than a second threshold. Here, the significant coefficient flag may be sig_coeff_flag, the parity level flag may be par_level_flag, the first coefficient level flag may be abs_level_gt1_flag, and the second coefficient level flag may be abs_level_gt3_flag or abs_level_gtx_flag.

Also, for example, the residual information may include a sign flag representing a sign of a residual coefficient of a target sample of the current block. The sign flag may be coeff_sign_flag.

Also, for example, the residual information may include coefficient value related information for a value of a residual coefficient of a target sample of the current block. The coefficient value related information may be abs_remainder and/or dec_abs_level.

The encoding apparatus encodes a BDPCM flag representing that the BDPCM is applied to the current block and a BDPCM direction flag representing a prediction direction for the current block S1040. The encoding apparatus may generate and encode the BDPCM flag representing that the BDPCM is applied to the current block and the BDPCM direction flag representing the prediction direction for the current block. The image information may include the BDPCM flag and the BDPCM direction flag.

For example, the BDPCM flag may represent whether the BDPCM is applied to the current block. For example, when the value of the BDPCM flag is 0, the BDPCM flag may represent that the BDPCM is not applied to the current block. When the value of the BDPCM flag is 1, the BDPCM flag may represent that BDPCM is applied to the current block and that a BDPCM direction flag for the current block is present. That is, for example, when the value of the BDPCM flag is 0, the BDPCM flag may represent that BDPCM is not applied to the current block, and that general intra prediction, IBC prediction, palette prediction or inter prediction is performed. When the value of the BDPCM flag is 1, the BDPCM flag may represent that the BDPCM is applied to the current block and that the BDPCM direction flag for the current block is present. For example, a syntax element of the BDPCM flag may be the bdpcm_flag, intra_bdpcm_luma_flag, or intra bdpcm_chroma_flag. Also, for example, the BDPCM flag may be signaled in units of coding units (CUs).

Also, for example, the BDPCM direction flag may represent the prediction direction for the current block. For example, when the value of the BDPCM flag is 1, the encoding apparatus may generate and encode the BDPCM direction flag. For example, the BDPCM direction flag may represent a vertical direction or a horizontal direction as the prediction direction for the current block. For example, when the value of the BDPCM direction flag is 0, the BDPCM direction flag may represent that the prediction direction for the current block is the horizontal direction, and when the value of the BDPCM direction flag is 1, The BDPCM direction flag may represent that the prediction direction for the current block is the vertical direction. For example, a syntax element of the BDPCM direction flag may be the bdpcm_dir_flag, intra_bdpcm_luma_dir_flag, or intra_bdpcm_chroma_dir_flag.

The encoding apparatus stores an intra prediction mode of the prediction direction as an intra prediction mode of the current block S1050. The encoding apparatus may store the intra prediction mode of the prediction direction (a vertical intra prediction mode or a horizontal intra prediction mode) as the intra prediction mode of the current block. For example, when the prediction direction is the horizontal direction, the horizontal intra prediction mode may be stored as the intra prediction mode of the current block, when the prediction direction is the vertical direction, the vertical intra prediction mode may be stored as the intra prediction mode of the current block. For example, the stored intra prediction mode may be used for prediction of a neighboring block of the current block and/or a corresponding block of a chroma component. For example, the stored intra prediction mode may be used to derive an intra prediction mode of the neighboring block of the current block and/or the corresponding block of the chroma component. For example, the stored intra prediction mode may be used as an intra prediction mode candidate of the neighboring block of the current block and/or the corresponding block of the chroma component.

Meanwhile, a bitstream including the image information may be transmitted to the decoding apparatus through a network or a (digital) storage medium. Here, the network may include a broadcast network and/or a communication network, and the digital storage medium may include various types of storage media such as an USB disk, an SD, a CD, a DVD, a Bluray disk, an HDD, and an SSD.

Figure 11:
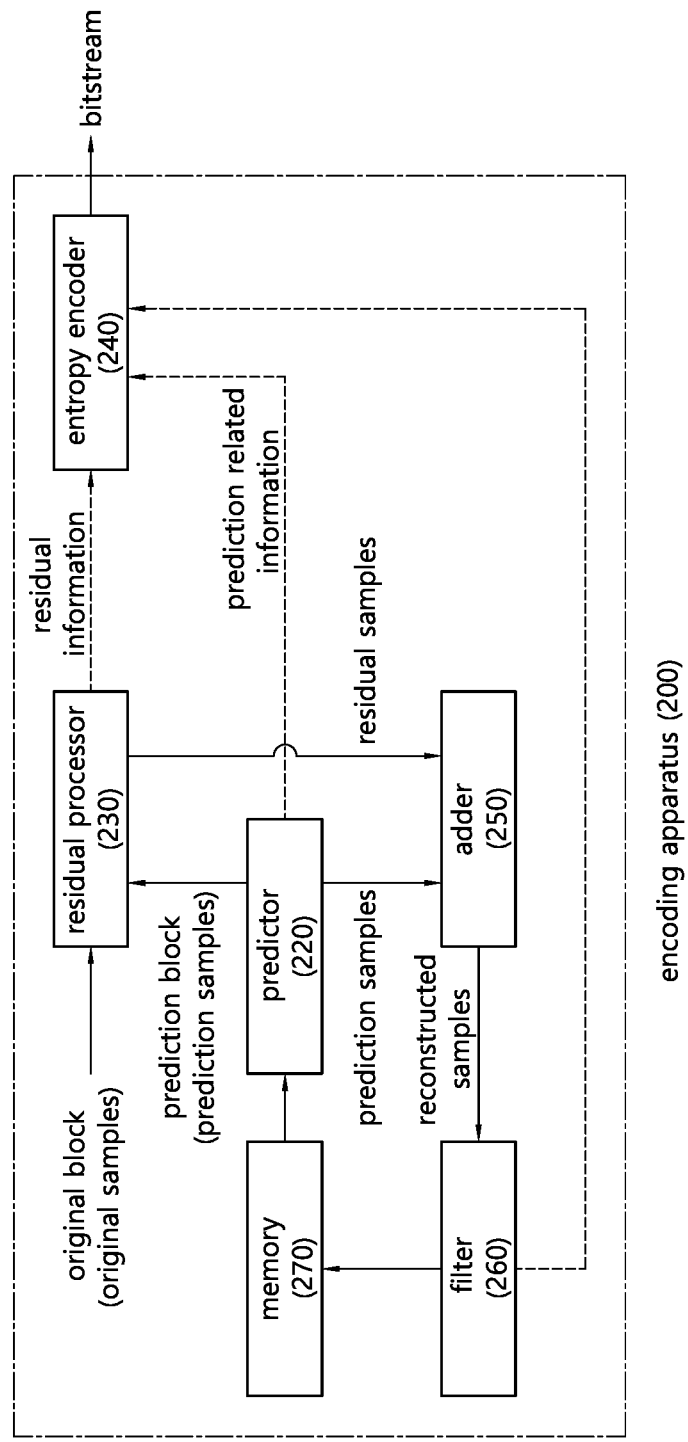
FIG. 11 schematically shows an encoding apparatus for performing an image encoding method according to this document.

FIG. 11 schematically shows an encoding apparatus for performing an image encoding method according to this document. The method disclosed in FIG. 10 may be performed by the encoding apparatus disclosed in FIG. 11. Specifically, for example, the predictor of the encoding apparatus of FIG. 11 may perform the S1000 of FIG. 10, the residual processor of the encoding apparatus of FIG. 11 may perform the S1010 to S1020 of FIG. 10, the entropy encoder of the encoding apparatus of FIG. 11 may perform the S1030 to S1040 of FIG. 10, the memory of the encoding apparatus of FIG. 11 may perform the S1050 of FIG. 10. Also, although not shown in the figure, a process of generating reconstructed samples and a reconstructed picture for the current block based on the prediction samples and the residual samples for the current block may be performed by the adder of the encoding apparatus.

Figure 12:
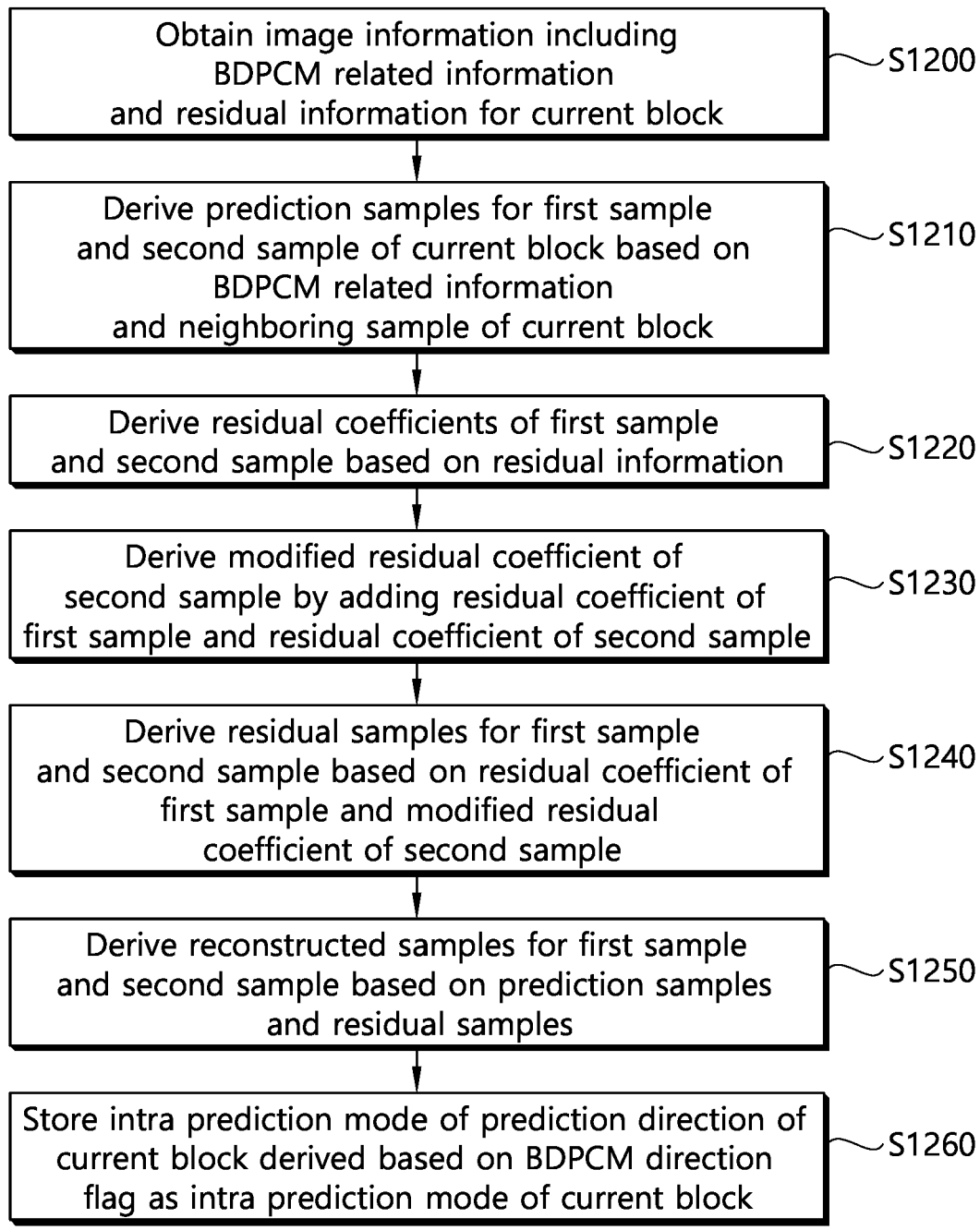
FIG. 12 schematically shows an image decoding method by a decoding apparatus according to this document.

FIG. 12 schematically shows an image decoding method by a decoding apparatus according to this document. The method disclosed in FIG. 12 may be performed by the decoding apparatus disclosed in FIG. 3. Specifically, for example, S1200 of FIG. 12 may be performed by the entropy decoder of the decoding apparatus, S1210 of FIG. 12 may be performed by the predictor of the decoding apparatus, S1220 to S1240 of FIG. 12 may be performed by the residual processor of the decoding apparatus, S1250 of FIG. 12 may be performed by the adder of the decoding apparatus, S1260 of FIG. 12 may be performed by the memory of the decoding apparatus.

The decoding apparatus obtains image information including Block-based Delta Pulse Code Modulation (BDPCM) related information and residual information for a current block S1200.

The decoding apparatus may obtain image information through a bitstream. For example, the image information may include Block-based Delta Pulse Code Modulation (BDPCM) related information for a current block. Also, for example, the BDPCM related information may include the BDPCM flag representing whether the BDPCM is applied to the current block. For example, the decoding apparatus may obtain the BDPCM flag representing whether the BDPCM is applied to the current block through the bitstream. For example, when the value of the BDPCM flag is 0, the BDPCM flag may represent that the BDPCM is not applied to the current block. When the value of the BDPCM flag is 1, the BDPCM flag may represent that BDPCM is applied to the current block and that a BDPCM direction flag for the current block is present. That is, for example, when the value of the BDPCM flag is 0, the BDPCM flag may represent that BDPCM is not applied to the current block, and that general intra prediction, IBC prediction, palette prediction or inter prediction is performed. When the value of the BDPCM flag is 1, the BDPCM flag may represent that the BDPCM is applied to the current block and that the BDPCM direction flag for the current block is present. For example, a syntax element of the BDPCM flag may be the bdpcm_flag, intra_bdpcm_luma_flag, or intra_bdpcm_chroma_flag. Also, for example, the BDPCM flag may be signaled in units of coding units (CUs). For example, the current block may be a coding block.

Also, for example, the decoding apparatus may obtain a BDPCM direction flag representing a prediction direction for the current block and residual information. For example, the image information may include the BDPCM related information and/or the residual information, the BDPCM related information may include the BDPCM direction flag.

For example, the decoding apparatus may obtain the BDPCM direction flag representing the prediction direction for the current block and the residual information based on the BDPCM flag. For example, when the BDPCM flag represents that the BDPCM is applied to the current block, the decoding apparatus may obtain the BDPCM direction flag. That is, for example, when the value of the BDPCM flag is 1, the decoding apparatus may obtain the BDPCM direction flag. For example, the BDPCM direction flag may represent a vertical direction or a horizontal direction as the prediction direction for the current block. For example, when the value of the BDPCM direction flag is 0, the BDPCM direction flag may represent that the prediction direction for the current block is the horizontal direction, and when the value of the BDPCM direction flag is 1, The BDPCM direction flag may represent that the prediction direction for the current block is the vertical direction. For example, a syntax element of the BDPCM direction flag may be the bdpcm_dir_flag, intra_bdpcm_luma_dir_flag, or intra_bdpcm_chroma_dir_flag.

Also, for example, the decoding apparatus may obtain residual information for the current block based on the BDPCM flag. For example, when the BDPCM flag represents that the BDPCM is applied to the current block, that is, when the BDPCM is applied to the current block, the residual information may include syntax elements for residual samples of the current block, and a difference between a residual coefficient value of the target residual sample and a residual coefficient value a left neighboring residual sample or a top neighboring residual sample of the target residual sample may be derived based on syntax elements for the target residual sample.

For example, the residual information may include syntax elements for a first sample representing a residual coefficient for the first sample and syntax elements for a second sample representing a difference between the residual coefficient for the first sample and a residual coefficient for the second sample. Here, the first sample may be a sample in the current block adjacent to a neighboring sample of the current block, and the second sample may be a sample in the current block adjacent to the first sample in a prediction direction for the current block. For example, the prediction direction for the current block may be a horizontal direction, the neighboring sample may be a left neighboring sample of the current block, and the first sample may be a sample located in a first column of the current block. Also, for example, the prediction direction for the current block may be a vertical direction, the neighboring sample may be a top neighboring sample of the current block, and the first sample may be a sample located in a first row of the current block.

For example, when the prediction direction of the current block is the horizontal direction, that is, when the prediction direction of the current block is derived in the horizontal direction based on the BDPCM direction flag, a difference between the residual coefficient value of the target sample and a residual coefficient value of a left neighboring sample of the target sample may be derived based on syntax elements for the target sample. Also, for example, when the prediction direction of the current block is the vertical direction, that is, when the prediction direction of the current block is derived in the vertical direction based on the BDPCM direction flag, a difference between the residual coefficient value of the target sample and a residual coefficient value of a top neighboring sample of the target sample may be derived based on syntax elements for the target sample. Also, when the target sample is located in a first row or column of the current block, a residual coefficient value of the target sample may be derived based on syntax elements for the target sample.

For example, the residual information may include syntax elements such as transform_skip_flag, last_sig_coeff_x_prefix, last_sig_coeff_y_prefix, last_sig_coeff_x_suffix, last_sig_coeff_y_suffix, coded_sub_block_flag, sig_coeff_flag, par_level_flag, abs_level_gt1_flag, abs_level_gtX_flag, abs_remainder, coeff_sign_flag, dec_abs_level and/or mts_idx.

Specifically, for example, the residual information may include a transform skip flag for the current block. The transform skip flag may represent whether the transform is applied to the current block. That is, the transform skip flag may represent whether the transform is applied to the residual coefficients of the current block. Also, for example, when a value of the BDPCM flag is 1, that is, when the BDPCM is applied to the current block, the transform skip flag for the current block may not be signaled, and a value of the transform skip flag may be inferred to be equal to 1. That is, when a value of the BDPCM flag is 1, that is, when the BDPCM is applied to the current block, the image information may not include the transform skip flag for the current block, a value of the transform skip flag may be inferred to be equal to 1, and the current block may be a transform skip block.

Also, for example, the residual information may include position information representing a position of a last non-zero residual coefficient in a residual coefficient array of the current block. That is, the residual information may include position information representing the position of the last non-zero residual coefficient in a scanning order of the current block. The position information may include information representing a prefix of a column position of the last non-zero residual coefficient, and information representing a prefix of a row position of the last non-zero residual coefficient, information representing a suffix of the column position of the last non-zero residual coefficient and information representing a suffix of the row position of the last non-zero residual coefficient. Syntax elements for the position information may be last_sig_coeff_x_prefix, last_sig_coeff_y_prefix, last_sig_coeff_x_suffix, and last_sig_coeff_y_suffix. Meanwhile, a non-zero residual coefficient may be referred to as a significant coefficient. Also, for example, when the current block is a transform skip block, the residual information may not include position information representing a position of a last non-zero residual coefficient in a residual coefficient array of the current block.

Also, for example, the residual information may include a significant coefficient flag representing whether a residual coefficient of a sample of the current block is a non-zero residual coefficient, a parity level flag for parity of a coefficient level for the residual coefficient, a first coefficient level flag representing whether the coefficient level is greater than a first threshold and a second coefficient level flag representing whether the coefficient level is greater than a second threshold. Here, the significant coefficient flag may be sig_coeff_flag, the parity level flag may be par_level_flag, the first coefficient level flag may be abs_level_gt1_flag, and the second coefficient level flag may be abs_level_gt3_flag or abs_level_gtx_flag.

Also, for example, the residual information may include a sign flag representing a sign of a residual coefficient of a sample of the current block. The sign flag may be coeff_sign_flag.

Also, for example, the residual information may include coefficient value related information for a value of a residual coefficient of a sample of the current block. The coefficient value related information may be abs remainder and/or dec_abs_level.

The decoding apparatus derives prediction samples for a first sample and a second sample of the current block based on the BDPCM related information and a neighboring sample of the current block S1210. The decoding apparatus may derive the prediction samples for the first sample and the second sample of the current block based on the BDPCM related information and a neighboring sample of the current block. For example, the decoding apparatus may derive the prediction samples for the first sample and the second sample by performing BDPCM prediction based on the BDPCM related information.

For example, the decoding apparatus may derive the prediction direction based on the BDPCM direction flag. For example, the decoding apparatus may derive the prediction direction indicated by the BDPCM direction flag as the prediction direction for the current block. For example, when a value of the BDPCM direction flag is 0, the BDPCM direction flag may represent that the prediction direction for the current block is a horizontal direction, when the value of the BDPCM direction flag is 1, the BDPCM direction flag may represent that the prediction direction for the current block is a vertical direction. For example, when the value of the BDPCM direction flag is 0, the prediction direction for the current block is derived in a horizontal direction, when the value of the BDPCM direction flag is 1, the prediction direction for the current block is derived in a vertical direction.

Then, for example, the decoding apparatus may derive prediction samples of the current block by performing intra prediction according to the derived prediction direction. For example, when the prediction direction for the current block is derived in the horizontal direction, the decoding apparatus may derive the prediction samples of the current block by performing intra prediction based on the left neighboring samples of the current block. For example, when the prediction direction for the current block is derived in the horizontal direction, the decoding apparatus may derive the prediction samples of the current block based on left neighboring samples of the current block. For example, when the prediction direction for the current block is derived in the horizontal direction, the decoding apparatus may derive the prediction samples for the first sample and the second sample based on a left neighboring sample of the current block. For example, when the prediction direction for the current block is derived in the horizontal direction, the decoding apparatus may derive a sample value of a left neighboring sample of the same row as the first sample and the second sample as a sample value of the prediction sample. Also, for example, when the prediction direction for the current block is derived in the vertical direction, the decoding apparatus may derive the prediction samples of the current block based on top neighboring samples of the current block. For example, when the prediction direction for the current block is derived in the vertical direction, the decoding apparatus may derive the prediction samples of the current block based on top neighboring samples of the current block. For example, when the prediction direction for the current block is derived in the vertical direction, the decoding apparatus may derive the prediction samples for the first sample and the second sample based on a top neighboring sample of the current block. For example, when the prediction direction for the current block is derived in the vertical direction, the decoding apparatus may derive a sample value of a top neighboring sample of the same column as the first sample and the second sample as a sample value of the prediction sample.

The decoding apparatus derives residual coefficients of the first sample and the second sample based on the residual information S1220.

For example, the residual information may include syntax elements for the first sample of the current block, a residual coefficient for the first sample may be derived based on the syntax elements for the first sample. Also, for example, the residual information may include syntax elements for the second sample of the current block, a residual coefficient for the first sample may be derived based on the syntax elements for the second sample.

The decoding apparatus derives a modified residual coefficient of the second sample by adding a residual coefficient of the first sample and a residual coefficient of the second sample S1230. For example, the decoding apparatus may derive a modified residual coefficient of the second sample by adding a residual coefficient of the first sample and a residual coefficient of the second sample. For example, the prediction direction of the current block may be the horizontal direction, the neighboring sample may be a left neighboring sample of the current block, and the first sample may be a sample located in a first column of the current block. Also, the second sample may be a sample in the current block adjacent to the first sample in the prediction direction. Also, for example, the prediction direction of the current block may be the vertical direction, the neighboring sample may be a top neighboring sample of the current block, and the first sample may be a sample located in a first row of the current block. Also, the second sample may be a sample in the current block adjacent to the first sample in the prediction direction.

The decoding apparatus derives residual samples for the first sample and the second sample based on the residual coefficient of the first sample and the modified residual coefficient of the second sample S1240.

For example, the decoding apparatus may dequantize the residual coefficient of the first sample to derive a residual sample for the first sample. That is, for example, a residual sample for the first sample may be derived by dequantizing the residual coefficient. Also, the decoding apparatus may dequantize the modified residual coefficient of the second sample to derive a residual sample for the second sample. That is, for example, a residual sample for the second sample may be derived by dequantizing the modified residual coefficient.

The decoding apparatus derives reconstructed samples for the first sample and the second sample based on the prediction samples and the residual samples S1250. For example, the decoding apparatus may derive the reconstructed samples by adding the prediction samples and the residual samples. Afterward, depending on the needs, to improve the subjective/objective image quality, an in-loop filtering procedure such as deblocking filtering and an SAO and/or ALF procedure may be applied to the reconstructed samples as described above.

The decoding apparatus stores an intra prediction mode of a prediction direction of the current block derived based on a BDPCM direction flag as an intra prediction mode of the current block S1260. The decoding apparatus may store the intra prediction mode of the prediction direction derived based on the BDPCM direction flag (a vertical intra prediction mode or a horizontal intra prediction mode) as the intra prediction mode of the current block. For example, when the prediction direction is the horizontal direction, the horizontal intra prediction mode may be stored as the intra prediction mode of the current block, when the prediction direction is the vertical direction, the vertical intra prediction mode may be stored as the intra prediction mode of the current block. For example, the stored intra prediction mode may be used for prediction of a neighboring block of the current block and/or a corresponding block of a chroma component. For example, the stored intra prediction mode may be used to derive an intra prediction mode of the neighboring block of the current block and/or the corresponding block of the chroma component. For example, the stored intra prediction mode may be used as an intra prediction mode candidate of the neighboring block of the current block and/or the corresponding block of the chroma component.

Figure 13:
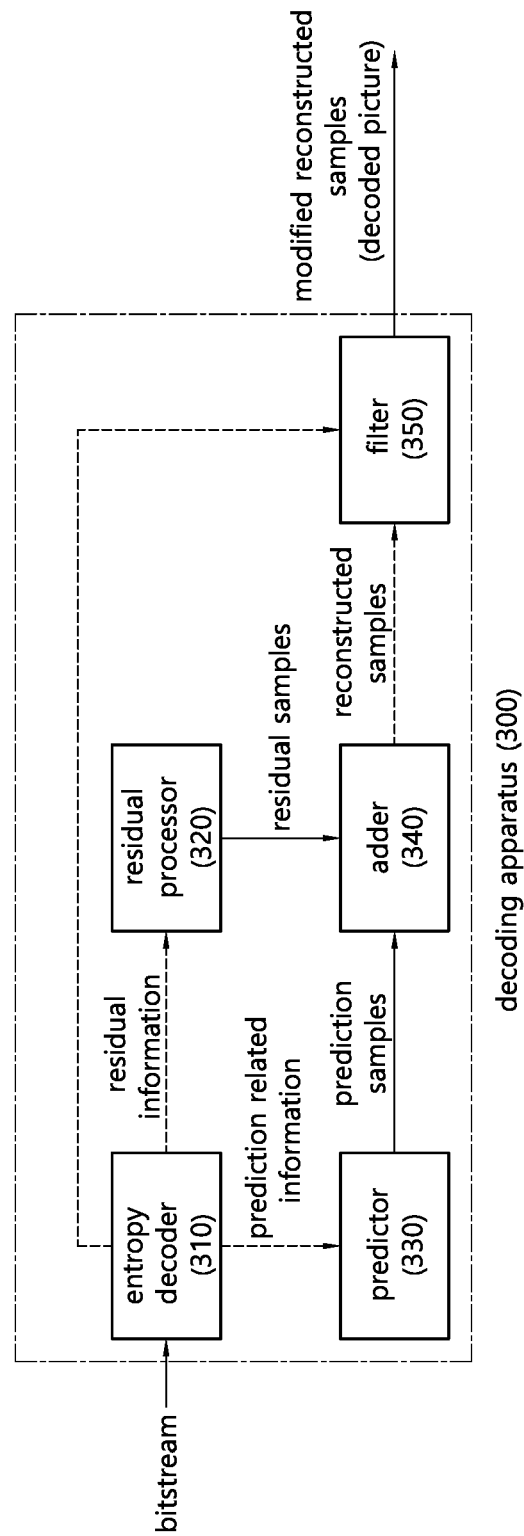
FIG. 13 schematically shows a decoding apparatus for performing an image decoding method according to this document.

FIG. 13 schematically shows a decoding apparatus for performing an image decoding method according to this document. The method disclosed in FIG. 12 may be performed by the decoding apparatus disclosed in FIG. 13. Specifically, for example, the entropy decoder of the decoding apparatus of FIG. 13 may perform the S1200 of FIG. 12, the predictor of the decoding apparatus of FIG. 13 may perform the S1210 of FIG. 12, the residual processor of the decoding apparatus of FIG. 13 may perform the S1220 to S1240 of FIG. 12, the adder of the decoding apparatus of FIG. 13 may perform the S1250 of FIG. 12, and the memory of the decoding apparatus of FIG. 13 may perform the S1260 of FIG. 12.

According to the present disclosure, intra prediction accuracy and coding efficiency can be improved by storing an intra prediction mode according to a BDPCM prediction direction as an intra prediction mode of a current block.

Also, according to the present disclosure, by storing the intra prediction mode according to the BDPCM prediction direction as the intra prediction mode of the current block, the accurate intra prediction mode can be referred to in the prediction of the neighboring block, and overall residual coding efficiency can be improved.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bit stream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

Figure 14:
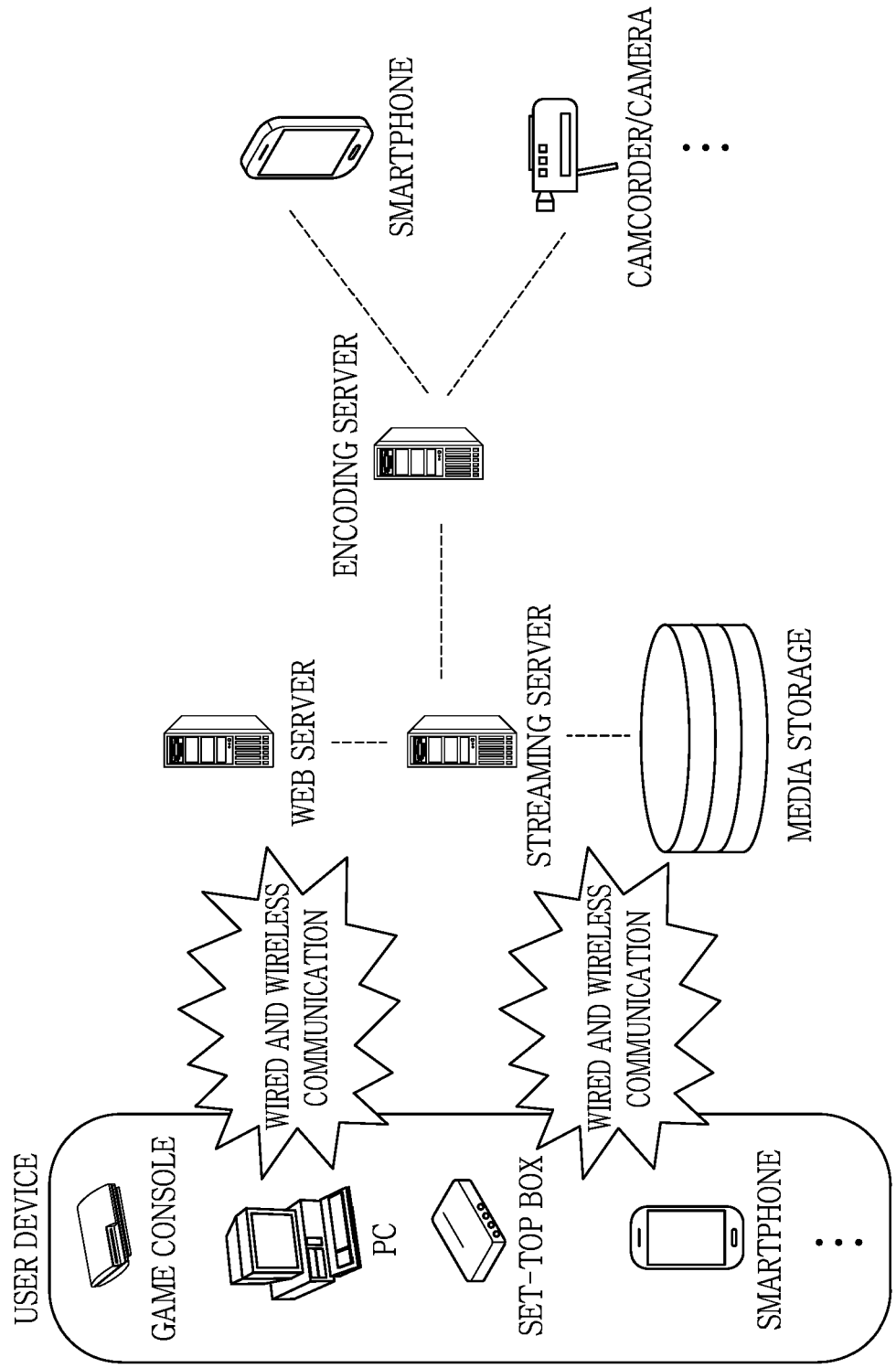
FIG. 14 illustrates a structural diagram of a contents streaming system to which the present disclosure is applied.

FIG. 14 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

What is claimed is:

1. An image decoding apparatus comprising:
a memory; and
at least one processor connected to the memory, the at least one processor configured to:
obtain image information including Block-based Delta Pulse Code Modulation (BDPCM) related information for a current block;
derive prediction samples for a first sample and a second sample of the current block based on the BDPCM related information and a neighboring sample of the current block; and
derive reconstructed samples for the first sample and the second sample based on the prediction samples;
wherein an intra prediction mode of a prediction direction of the current block is derived based on a BDPCM direction flag as an intra prediction mode of the current block,
wherein the BDPCM related information includes the BDPCM direction flag representing the prediction direction,
wherein based on the prediction direction being a horizontal direction, a horizontal intra prediction mode is derived as an intra prediction mode of the current block,
wherein based on the prediction direction being a vertical direction, a vertical intra prediction mode is derived as the intra prediction mode of the current block, wherein the first sample is a sample in the current block adjacent to the neighboring sample, and the second sample is a sample in the current block adjacent to the first sample in the prediction direction, wherein the intra prediction mode derived as the intra prediction mode of the current block is used for prediction for a block coded after the current block, and wherein the block coded after the current block is a block within a current Coding Tree Unit (CTU) or a neighboring CTU in a current picture or a reference picture.

2. An image encoding apparatus comprising:

a memory; and at least one processor connected to the memory, the at least one processor configured to:

derive prediction samples for a first sample and a second sample of a current block based on Block-based Delta Pulse Code Modulation (BDPCM) and a neighboring sample of the current block; and encode a BDPCM flag representing that the BDPCM is applied to the current block and a BDPCM direction flag representing a prediction direction for the current block;

wherein an intra prediction mode of the prediction direction as an intra prediction mode of the current block is derived based on the BDPCM, wherein the first sample is a sample in the current block adjacent to the neighboring sample, and the second sample is a sample in the current block adjacent to the first sample in the prediction direction, wherein based on the prediction direction being a horizontal direction, a horizontal intra prediction mode is derived as an intra prediction mode of the current block, wherein based on the prediction direction being a vertical direction, a vertical intra prediction mode is derived as the intra prediction mode of the current block, wherein the intra prediction mode derived as the intra prediction mode of the current block is used for prediction for a block coded after the current block, and wherein the block coded after the current block is a block within a current Coding Tree Unit (CTU) or a neighboring CTU in a current picture or a reference picture.

3. A non-transitory computer-readable storage medium storing a bitstream comprising the BDPCM flag and the BDPCM direction flag encoded by the image encoding apparatus of claim 2.

4. An apparatus for transmitting a bitstream for an image, the apparatus comprising:

at least one processor configured to obtain the bitstream generated by an encoding apparatus; and a transmitter configured to transmit the bitstream;

the bitstream is generated by:

deriving prediction samples for a first sample and a second sample of a current block based on Block-based Delta Pulse Code Modulation (BDPCM) and a neighboring sample of the current block; and encoding a BDPCM flag representing that the BDPCM is applied to the current block and a BDPCM direction flag representing a prediction direction for the current block;

wherein an intra prediction mode of the prediction direction as an intra prediction mode of the current block is derived based on the BDPCM, wherein the first sample is a sample in the current block adjacent to the neighboring sample, and the second sample is a sample in the current block adjacent to the first sample in the prediction direction, wherein based on the prediction direction being a horizontal direction, a horizontal intra prediction mode is derived as an intra prediction mode of the current block, wherein based on the prediction direction being a vertical direction, a vertical intra prediction mode is derived as the intra prediction mode of the current block, wherein the intra prediction mode derived as the intra prediction mode of the current block is used for prediction for a block coded after the current block, and wherein the block coded after the current block is a block within a current Coding Tree Unit (CTU) or a neighboring CTU in a current picture or a reference picture.

* * * * *